United States Patent
Honda et al.

(10) Patent No.: US 8,936,129 B2
(45) Date of Patent: Jan. 20, 2015

(54) ELECTRIC STRADDLED VEHICLE

(75) Inventors: Koichiro Honda, Wako (JP); Hideaki Nakagawa, Wako (JP); Masahide Mimura, Wako (JP); Hiroshi Iwakami, Wako (JP); Kazuo Sato, Wako (JP); Keiichiro Niizuma, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 574 days.

(21) Appl. No.: 13/256,877

(22) PCT Filed: Feb. 12, 2010

(86) PCT No.: PCT/JP2010/052064
§ 371 (c)(1),
(2), (4) Date: Sep. 15, 2011

(87) PCT Pub. No.: WO2010/109969
PCT Pub. Date: Sep. 30, 2010

(65) Prior Publication Data
US 2012/0000720 A1    Jan. 5, 2012

(30) Foreign Application Priority Data

Mar. 27, 2009 (JP) ................................. 2009-079222
Mar. 27, 2009 (JP) ................................. 2009-079223
Sep. 15, 2009 (JP) ................................. 2009-213809

(51) Int. Cl.
  *B60K 1/00*   (2006.01)
  *B62M 7/12*   (2006.01)
  *B62K 11/10*  (2006.01)

(52) U.S. Cl.
  CPC .................. *B62K 11/10* (2013.01); *B62M 7/12* (2013.01); *B62K 2202/00* (2013.01); *B62K 2204/00* (2013.01)

USPC ............................................. 180/291; 180/220

(58) Field of Classification Search
  USPC ............ 180/65.1, 65.31, 65.6, 220, 226, 248, 180/291, 221
  See application file for complete search history.

(56) References Cited

U.S. PATENT DOCUMENTS

| 5,421,427 | A  | * | 6/1995 | Ogawa et al. ................. 180/220 |
| 5,524,726 | A  | * | 6/1996 | Wright, Jr. .................... 180/220 |
| 6,176,338 | B1 | * | 1/2001 | Nakagawa et al. ........... 180/219 |

(Continued)

FOREIGN PATENT DOCUMENTS

| EP | 1 405 785 A2 | 4/2004 |
| JP | 5-139365 A   | 6/1993 |

(Continued)

*Primary Examiner* — Katy M Ebner
*Assistant Examiner* — Brodie Follman
(74) *Attorney, Agent, or Firm* — Birch, Stewart, Kolasch & Birch, LLP

(57) ABSTRACT

Provided is an electric vehicle that realizes a light electric straddled vehicle using a motor with a small size, and optimizes the left and right weight balances in the width direction of the vehicle with respect to the vehicle body centerline. The electric motor (250) is disposed inside a swing arm (124) of a cantilever type at a position overlapping a projection area of a rear wheel WR when seen from the side portion of the vehicle body. The motor driver (216) is disposed inside the swing arm (124) so that the vehicle body centerline (C) passing through at the front side of the vehicle body in the rear wheel (WR). The position (G2) of the center of gravity of the motor driver (216) is disposed to be offset in the direction opposite to the offset direction of the electric motor (250) with respect to the vehicle body centerline (C).

18 Claims, 25 Drawing Sheets

(56) References Cited

U.S. PATENT DOCUMENTS

| | | | |
|---|---|---|---|
| 7,017,694 B2 * | 3/2006 | Shirazawa | 180/65.51 |
| 7,527,111 B2 * | 5/2009 | Katsuhiro et al. | 180/65.225 |
| 7,870,921 B2 * | 1/2011 | Terada et al. | 180/206.1 |
| 7,931,110 B2 * | 4/2011 | Nishiura et al. | 180/220 |
| 8,002,067 B2 * | 8/2011 | Nishiura et al. | 180/220 |
| 8,028,785 B2 * | 10/2011 | Kanno et al. | 180/220 |
| 8,167,070 B2 * | 5/2012 | Takamura et al. | 180/68.5 |
| 8,360,188 B2 * | 1/2013 | Yonehana et al. | 180/220 |
| 8,371,411 B2 * | 2/2013 | Kawaguchi et al. | 180/220 |
| 8,443,926 B2 * | 5/2013 | Kanno et al. | 180/220 |
| 8,453,782 B2 * | 6/2013 | Kondo et al. | 180/291 |
| 8,505,668 B2 * | 8/2013 | Iwakami et al. | 180/220 |
| 8,617,730 B2 * | 12/2013 | Tsukamoto et al. | 429/7 |
| 8,627,915 B2 * | 1/2014 | Tsukamoto et al. | 180/222 |
| 8,733,486 B2 * | 5/2014 | Nishiura et al. | 180/68.5 |
| 2004/0079574 A1 | 4/2004 | Ono et al. | |
| 2004/0238242 A1 | 12/2004 | Honda et al. | |
| 2009/0020352 A1 | 1/2009 | Horii et al. | |
| 2010/0078237 A1 * | 4/2010 | Yonehana et al. | 180/65.51 |
| 2010/0078248 A1 * | 4/2010 | Kanno et al. | 180/220 |
| 2010/0078249 A1 * | 4/2010 | Nishiura et al. | 180/220 |
| 2010/0078251 A1 * | 4/2010 | Nishiura et al. | 180/229 |
| 2010/0163326 A1 * | 7/2010 | Takamura et al. | 180/68.5 |
| 2011/0139531 A1 * | 6/2011 | Kanno et al. | 180/220 |
| 2011/0290578 A1 * | 12/2011 | Nishiura et al. | 180/291 |
| 2012/0000720 A1 * | 1/2012 | Honda et al. | 180/65.1 |
| 2012/0000724 A1 * | 1/2012 | Mimura et al. | 180/291 |
| 2012/0048630 A1 * | 3/2012 | Nishiura et al. | 180/65.31 |
| 2012/0080254 A1 * | 4/2012 | Tsukamoto et al. | 180/68.5 |
| 2012/0082881 A1 * | 4/2012 | Tsukamoto et al. | 429/120 |
| 2012/0160579 A1 * | 6/2012 | Taniguchi et al. | 180/65.1 |
| 2012/0175178 A1 * | 7/2012 | Iwakami et al. | 180/210 |
| 2012/0181097 A1 * | 7/2012 | Hatanaka et al. | 180/65.31 |
| 2012/0248851 A1 * | 10/2012 | Nakashima | 301/6.5 |
| 2012/0318601 A1 * | 12/2012 | Kuroki | 180/220 |
| 2013/0161107 A1 * | 6/2013 | Tsukamoto et al. | 180/220 |
| 2013/0168173 A1 * | 7/2013 | Kikuchi | 180/220 |
| 2013/0175102 A1 * | 7/2013 | Tsukamoto et al. | 180/21 |
| 2013/0228389 A1 * | 9/2013 | Nakashima et al. | 180/220 |
| 2013/0281249 A1 * | 10/2013 | Mimura | 475/150 |
| 2013/0284527 A1 * | 10/2013 | Murakami et al. | 180/55 |
| 2014/0015455 A1 * | 1/2014 | Yonehana | 318/139 |

FOREIGN PATENT DOCUMENTS

| | | |
|---|---|---|
| JP | 7-108837 A | 4/1995 |
| JP | 2987466 B2 | 12/1999 |
| JP | 3127529 B2 | 1/2001 |
| JP | 2001-171585 A | 6/2001 |
| JP | 2004-122981 A | 4/2004 |
| JP | 2008-221976 A | 9/2008 |
| JP | 2009-023449 A | 2/2009 |

* cited by examiner

ELECTRIC STRADDLED VEHICLE

TECHNICAL FIELD

The present invention relates to an electric straddled vehicle, and particularly, to an electric straddled vehicle that drives a driving wheel using an electric motor.

BACKGROUND ART

Conventionally, there is known an electric straddled vehicle that drives a driving wheel using an electric motor.

Patent Document 1 discloses a scooter-type electric vehicle with a cantilever-type swing arm journaling a rear wheel at one arm portion, where an output shaft of an electric motor is disposed at the same position as that of an axle of the rear wheel using a planetary speed reduction gear, and a control device of the electric motor is accommodated inside the arm portion.

Further, in such an electric vehicle, the arrangement of the electric motor and a battery as a power supply source is an important factor on the layout of the vehicle body.

Patent Document 2 discloses a scooter-type electric vehicle with a cantilever-type swing arm journaling a rear wheel at one arm portion, where an electric motor is accommodated inside a wide portion provided with a pivot portion swingably journaling the swing arm to a vehicle body frame. Further, a plurality of batteries is distributed near the front side of a vehicle body, the center of the vehicle body, and the rear side of the vehicle body.

Further, Patent Document 3 discloses a scooter-type electric vehicle with a cantilever-type swing arm journaling a rear wheel at one arm portion, where an electric motor is accommodated inside one arm portion provided at the left side in the width direction of the vehicle.

CITATION LIST

Patent Document

[Patent Document 1] Japanese Unexamined Patent Application Publication No. 2004-122981
[Patent Document 2] Japanese Patent No. 3127529
[Patent Document 3] Japanese Patent No. 2987466

SUMMARY OF INVENTION

Technical Problem

However, in the electric vehicle disclosed in Patent Document 1, since the rear wheel is driven by the motor coaxially provided with the rear wheel, a driving torque cannot be obtained by a speed reducing mechanism. For this reason, a large-diameter exclusive motor is needed, and an electric bicycle which is light in weight and cheap in cost is difficult to be provided. Since the electric motor and a control unit (a motor driver) are all accommodated in one arm portion provided at the left side of the swing arm in the width direction of the vehicle, the distribution of weight at the left side of the vehicle body becomes larger than that at the right side of the vehicle body, so that the weight balance is poor. Then, there is a possibility that the rigidity of the swing arm needs to be increased.

An object of the present invention is to provide an electric straddled vehicle that solves the above-described problem of the prior art, realizes a light and cheap electric straddled vehicle using a small-sized motor with high versatility, optimizes the left and right weight balances in the width direction of the vehicle with respect to the vehicle body centerline, and decreases the weight of a swing arm.

Further, in the electric vehicles disclosed in Patent Documents 2 and 3, there is a possibility that the distribution of weight at the left side in the width direction of the vehicle becomes larger than that at the right side in the width direction of the vehicle, and there is no consideration about that the left and right weight balances in the width direction of the vehicle with respect to the vehicle body centerline are obtained on the basis of the examination of the arrangement relationship between the electric motor and the battery.

An object of the present invention is to provide an electric straddled vehicle that solves the above-described problem of the background art and settles the left and right weight balances in the width direction of the vehicle with respect to the vehicle body centerline.

Solution to Problem

To achieve the above objects, the present invention has a first feature in that an electric straddled vehicle (1, 200) comprising: a swing arm (12, 214) which is swingably journaled to a vehicle body frame and rotatably journals a rear wheel (WR); an electric motor (50, 250) which supplies a rotational driving force to said rear wheel (WR); and a motor driver (35, 216) which has a driving circuit of the electric motor (50, 250) in said swing arm (12, 214), wherein said electric motor (50, 250) is disposed at a position where a rotary shaft (53, 278) of said electric motor (50, 250) is parallel to an axle (19, 253) of said rear wheel (WR) and is offset therefrom in the width direction of the vehicle and an outer diameter of said electric motor (50, 250) overlaps an outer diameter of said rear wheel (WR) at one side position of said rear wheel (WR) in the width direction of the vehicle when seen from a side portion of the vehicle body, and said motor driver (35, 216) is disposed at a front side of the vehicle body in said rear wheel (WR) so that a vehicle body centerline (C) is disposed across the width direction of the vehicle.

The present invention has a second feature in that said motor driver (35, 216) is disposed such that a position (G2) of the center of gravity thereof is offset in a direction opposite to an offset direction of said electric motor (50, 250) with respect to the vehicle body centerline (C).

The present invention has a third feature in that said motor driver (216) is disposed at a rear side of the vehicle body in a swing shaft (215) to be close to the swing shaft (215) of said swing arm (214), and is inserted into a recess (308) being open at an upper surface of said swing arm (214) to be attached into said swing arm (214).

The present invention has a fourth feature in that said motor driver (216) includes a body (312) and a cover member (264) fixed to an upper portion of the body (312), wherein at least a switching element (316) disconnecting or connecting a supply of a current to the motor is supported to a lower surface of said cover member (264), and when said motor driver (216) is attached to said swing arm (214), said cover member (264) is exposed to the outside.

The present invention has a fifth feature in that said cover member (264) is provided with an attachment portion (306) which is used to fix said motor driver (216) to said swing arm (214).

The present invention has a sixth feature in that in said motor driver (216), a terminal (269) is disposed at an approximate center of the vehicle body to be connected with a power system harness (258) supplying power to a group of said switching element (316) and a battery (213), and a coupler portion (268) connected with a control system harness (256) and a capacitor (323) smoothing power of an inverter are provided at a position where said electric motor (250) is offset from the vehicle body centerline (C) and is located at the outside in the width direction of the vehicle.

The present invention has a seventh feature in that said motor driver (35) is disposed at the lower side of the vehicle body more than the swing shaft (12) to be close to a swing shaft (11) of said swing arm (12), and is inserted into an opening provided at the lower surface of said swing arm (12) to be attached into said swing arm (12).

The present invention has a eighth feature in that the upper surface of said swing arm (12) is provided with an electric fan (82) which is located above said motor driver (35).

The present invention has a ninth feature in comprising a plurality of heat radiation fins (81) which is integrally formed on the upper surface of said swing arm (12) above said motor driver (35) to extend to an upper side of the vehicle body, wherein said electric fan (82) is disposed at upper portions of said heat radiation fins (81) so that a rotary shaft (82a) is directed in a vertical direction of the vehicle body.

The present invention has a tenth feature in comprising a center stand (18) which is rotatably journaled to said vehicle body frame, wherein said center stand (18) is configured to contact the lower surface of said swing arm (12) at the lower side of the vehicle body in said motor driver (35) when the center stand is retracted.

The present invention has a eleventh feature in further comprising a high-voltage battery (31) which supplies power to said electric motor (50); and a low-voltage battery (30) which supplies power to electric auxiliary machinery and is smaller than said high-voltage battery (31), wherein said electric motor (50) is disposed inside said swing arm (12) at a position overlapping a projection area of said rear wheel (WR) when seen from the side portion of the vehicle body, so that it is disposed to be offset in the width direction of the vehicle with respect to the vehicle body centerline (C) passing through a front wheel (WF) and the rear wheel (WR) of said electric straddled vehicle, and said high-voltage battery (31) is disposed along a lower frame (5) which extends backward and downward from a head pipe (3) of said vehicle body frame and has the swing shaft (11) of said swing arm (12) provided at the rear side thereof, and said low-voltage battery (30) is disposed to be offset in a direction opposite to the offset direction of said electric motor (50) with respect to said vehicle body centerline (C).

The present invention has a twelfth feature in that said low-voltage battery (30) is disposed at the side portion of said head pipe (3).

The present invention has a thirteen feature in that the position (G1) of the center of gravity of said high-voltage battery (31) is set to be offset in the width direction of the vehicle with respect to said vehicle body centerline (C), and the offset direction is opposite to the offset direction of said electric motor (50) with respect to the vehicle body centerline (C).

The present invention has a fourteen feature in that said swing arm (12) is of a cantilever type having only one arm portion rotatably journaling the rear wheel, and the rotary shaft (43) of said electric motor (50) is disposed to be parallel to the axle (19) of said rear wheel (WR).

Advantageous Effects of Invention

According to the first feature, said electric motor is disposed at a position where a rotary shaft of said electric motor is parallel to an axle of said rear wheel and is offset therefrom in the width direction of the vehicle. Therefore, the speed reducing mechanism may be provided at the driving mechanism system, and the motor which is light in weight, cheap in cost, and highly versatile may be selected. Furthermore, an outer diameter of said electric motor overlaps an outer diameter of said rear wheel at one side position of said rear wheel in the width direction of the vehicle when seen from a side portion of the vehicle body and said motor driver is disposed at a front side of the vehicle body in said rear wheel so that a vehicle body centerline is disposed across the width direction of the vehicle. Therefore, the position of the center of gravity in the width direction of the vehicle may be set to the vicinity of the center of the vehicle body compared to the configuration in which the motor driver is disposed near the center in the width direction of the vehicle more than the electric motor and the motor driver are both disposed to be offset in the same direction with respect to the vehicle body centerline. Accordingly, the weight balance in the width direction of the vehicle is improved, the burden on the swing shaft of the swing arm is reduced, and the weight of the swing arm is decreased.

According to the second feature, said motor driver is disposed such that a position of the center of gravity thereof is offset in a direction opposite to an offset direction of said electric motor with respect to the vehicle body centerline. Therefore, for example, since the position of the center of gravity of the motor driver is located on the vehicle body centerline, the weight balance in the width direction of the vehicle may be settled by disposing the position of the center of gravity of the motor driver to be offset to the vicinity of the center in the width direction of the vehicle compared to a configuration in which the position of the center of gravity of the vehicle body is located at the vicinity of the electric motor.

According to the third feature, said motor driver is disposed at a rear side of the vehicle body in a swing shaft to be close to the swing shaft of said swing arm, and is inserted into a recess being open at an upper surface of said swing arm to be attached into said swing arm. Therefore, the heavy motor driver is disposed at the low position of the vehicle body and the position of the center of gravity of the electric vehicle may be lowered. Further, since the heavy motor driver is disposed near the swing shaft of the swing arm, the moment of inertia generated when the swing arm swings may be made small.

According to the fourth feature, said motor driver includes a body and a cover member fixed to an upper portion of the body, wherein at least a switching element disconnecting or connecting a supply of a current to the motor is supported to a lower surface of said cover member, and when said motor driver is attached to said swing arm, said cover member is exposed to the outside. Therefore, the heat of the switching element generated when the motor driver is driven may be efficiently cooled.

According to the fifth feature, said cover member is provided with an attachment portion which is used to fix said motor driver to said swing arm. Therefore, the cover member may have an attachment function to the swing arm, so that a separate component for attachment is not needed, and the number of components may be reduced.

According to the sixth feature, in said motor driver, a terminal is disposed at an approximate center of the vehicle body to be connected with a power system harness supplying power to a group of said switching element and a battery, and a coupler portion connected with a control system harness and a capacitor smoothing power of an inverter are provided at a position where said electric motor is offset from the vehicle body centerline and is located at the outside in the width direction of the vehicle. Therefore, the switching element or the power harness with a large diameter may be disposed at a position where the horizontal moment of the swing arm is rarely exerted. Further, since a large component such as a capacitor or a coupler is disposed at the outside in the width direction of the vehicle to be located at the opposite side of the arm portion of the swing arm, a degree in freedom of design of the swing arm increases, so that the space of the motor driver extending in the width direction of the vehicle may be efficiently used.

According to the seventh feature, said motor driver is disposed at the lower side of the vehicle body more than the swing shaft to be close to a swing shaft of said swing arm, and is inserted into an opening provided at the lower surface of said swing arm to be attached into said swing arm. Therefore, since the heavy motor driver is disposed at the low position of the vehicle body, the position of the center of gravity of the electric vehicle may be lowered. Furthermore, since the motor driver is attached to the inside of the swing arm through an opening provided at the lower surface of the swing arm, the motor driver may be detached without detaching the swing arm, and the maintenance workability may be improved.

According to the eighth feature, the upper surface of said swing arm is provided with an electric fan which is located above said motor driver. Therefore, the motor driver may be actively cooled by the compulsory blowing using the electric fan.

According to the ninth feature, a plurality of heat radiation fins which is integrally formed on the upper surface of said swing arm above said motor driver to extend to an upper side of the vehicle body is comprised, wherein said electric fan is disposed at upper portions of said heat radiation fins so that a rotary shaft is directed in a vertical direction of the vehicle body. Therefore, the cooling effect of the motor driver may be improved.

According to the tenth feature, a center stand which is rotatably journaled to said vehicle body frame is comprised, wherein said center stand is configured to contact the lower surface of said swing arm at the lower side of the vehicle body in said motor driver when the center stand is retracted. Therefore, the center stand is located below the motor driver when the electric vehicle runs, and the lower surface of the swing arm may be protected from stones or the like using the center stand when the electric vehicle runs. Accordingly, since there is no need to excessively thicken the lower surface of the swing arm of the portion protecting the motor driver, the weight of the swing arm may be reduced.

According to the eleventh feature, said electric motor is disposed inside said swing arm at a position overlapping a projection area of said rear wheel when seen from the side portion of the vehicle body, so that it is disposed to be offset in the width direction of the vehicle with respect to the vehicle body centerline passing through a front wheel and the rear wheel of said electric straddled vehicle, and said high-voltage battery is disposed along a lower frame which extends backward and downward from a head pipe of said vehicle body frame and has the swing shaft of said swing arm provided at the rear side thereof, and said low-voltage battery is disposed to be offset in a direction opposite to the offset direction of said electric motor with respect to said vehicle body centerline. Therefore, for example, compared to a configuration in which the electric motor and the low-voltage battery are both disposed to be offset in the same direction, the weight balance in the width direction of the vehicle may be settled by disposing the position of the center of gravity in the width direction of the vehicle to be offset to the vicinity of the center of the vehicle body. Further, in a configuration in which the high-voltage battery is disposed at the approximate center in the longitudinal direction of the vehicle body and the electric motor is disposed to be offset to the rear side of the vehicle body with respect to the vehicle body centerline, the weight balance in the width direction of the vehicle may be settled by using the low-voltage battery which is smaller than the high-voltage battery and has a high degree of freedom in design of the layout.

According to the twelfth feature, since said low-voltage battery is disposed at the side portion of said head pipe, the weight balance in the width direction of the vehicle may be settled by efficiently using the space near the head pipe having an extra space. Further, the electric motor is disposed at the rear side of the vehicle body, whereas the heavy low-voltage battery is disposed at the front side of the vehicle body, so that the weight balance in the longitudinal direction of the vehicle body may be settled. Furthermore, the high-voltage battery is disposed at the low position of the vehicle body along the lower frame, whereas the low-voltage battery is disposed at a comparatively high position of the vehicle body, so that the position of the center of gravity in the height direction may be also settled.

According to the thirteenth feature, the position of the center of gravity of said high-voltage battery is set to be offset in the width direction of the vehicle with respect to said vehicle body centerline, and the offset direction is opposite to the offset direction of said electric motor with respect to the vehicle body centerline. Therefore, the weight balance in the width direction of the vehicle may be settled by using the high-voltage battery as well as the low-voltage battery.

According to the fourteenth feature, said swing arm is of a cantilever type having only one arm portion rotatably journaling the rear wheel, and the rotary shaft of said electric motor is disposed to be parallel to the axle of said rear wheel. Therefore, even in the structure in which the electric motor is largely offset in the width direction of the vehicle, the weight balance in the width direction of the vehicle may be settled.

DESCRIPTION OF EMBODIMENTS

Figure 1:
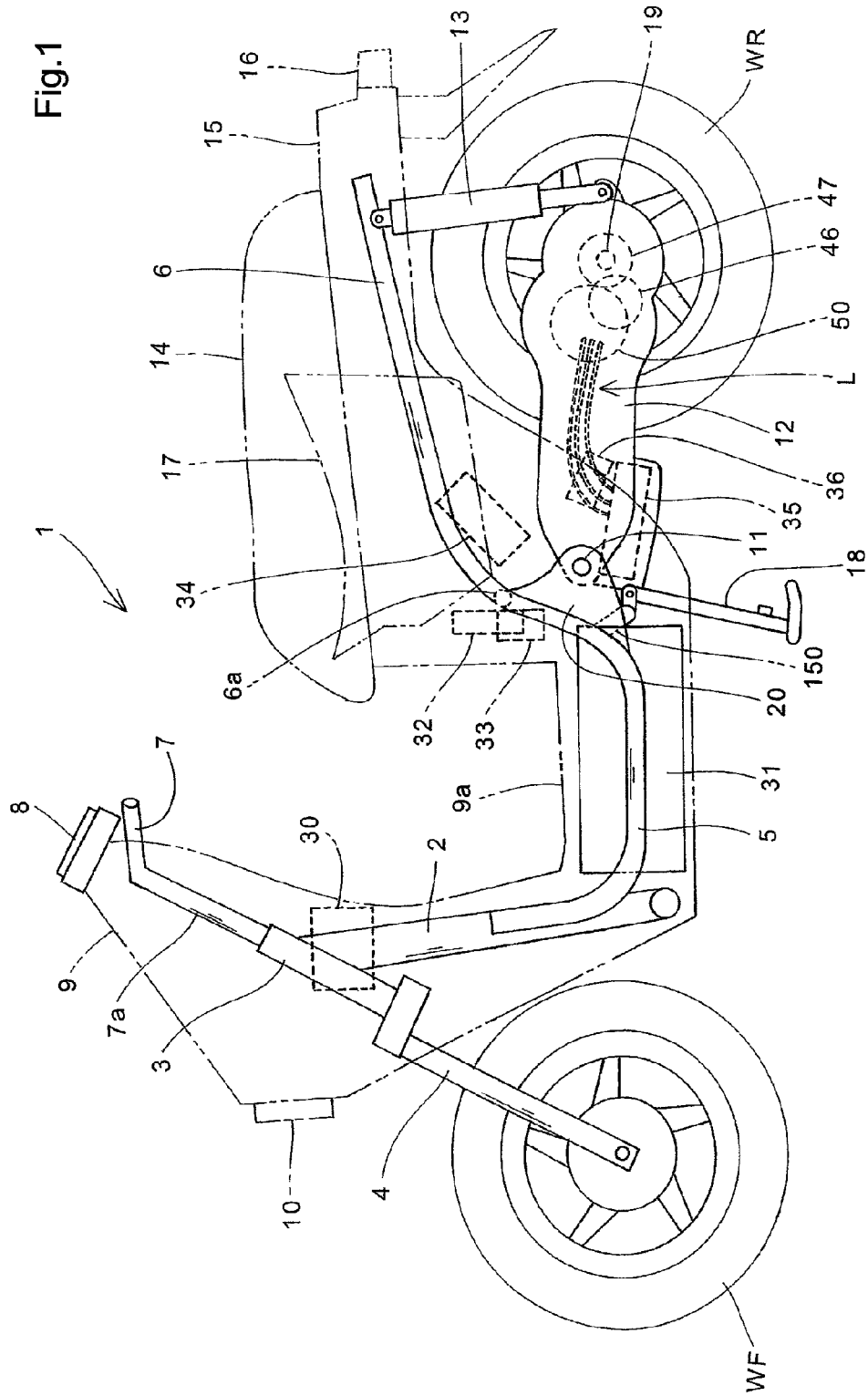
FIG. 1 is a side view illustrating an electric vehicle according to an embodiment of the present invention.
Figure 2:
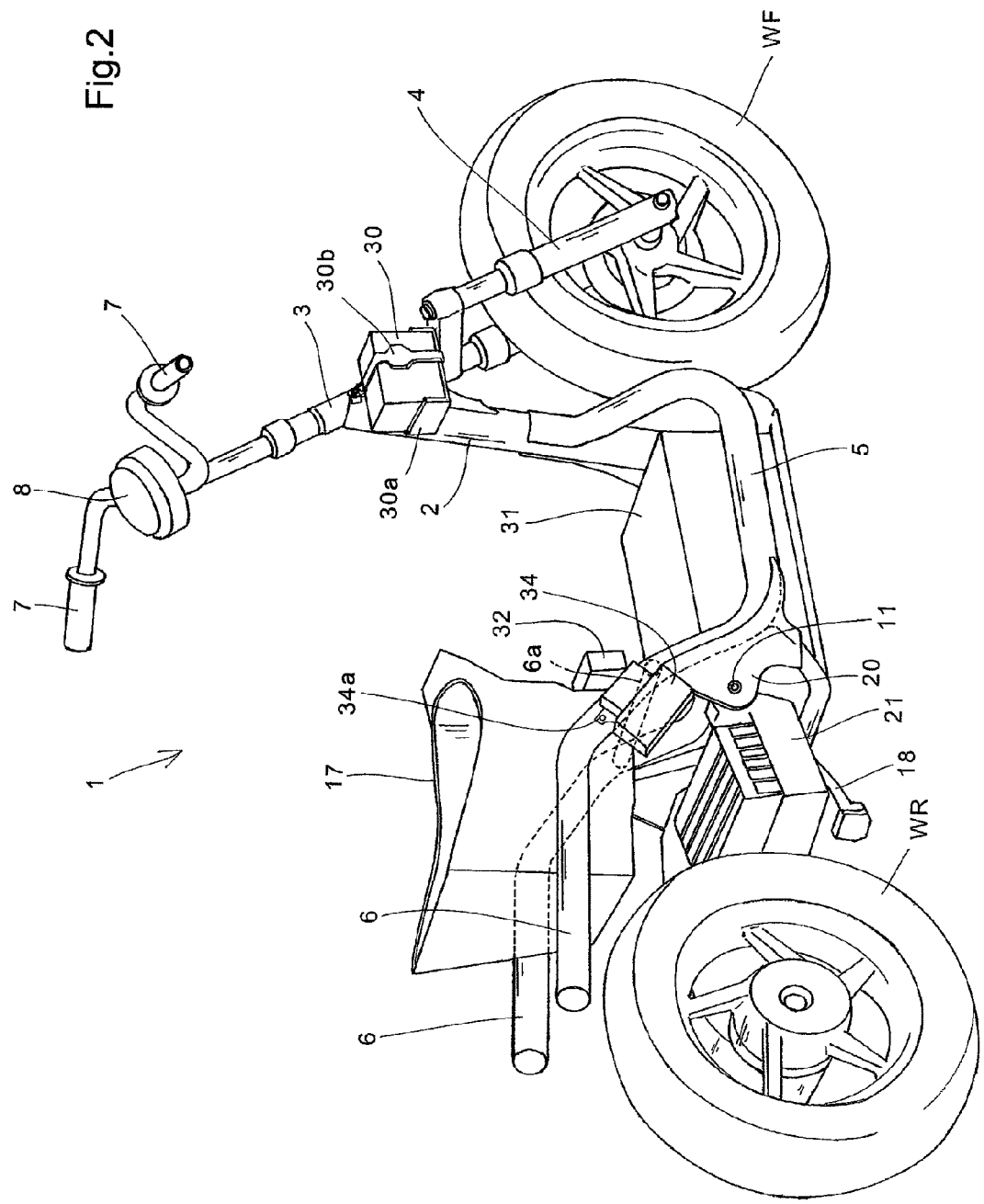
FIG. 2 is a rear perspective view illustrating the electric vehicle.

Hereinafter, preferred embodiments of the present invention will be described in detail by referring to the drawings. FIG. 1 is a side view illustrating an electric straddled vehicle 1 according to an embodiment of the present invention. Further, FIG. 2 is a rear perspective view illustrating the electric vehicle 1 from which an exterior component is detached. The electric vehicle 1 is a scooter-type electric bicycle with a low floor 9a, and is configured to drive a rear wheel WR using a rotational driving force of an electric motor 50 (refer to FIG. 4) built in a swing arm 12. Furthermore, a high-voltage battery 31 supplying power to the electric motor 50 may be charged in a manner such that an external power supply is connected to a charging port (not show) provided in a vehicle body.

A head pipe 3 is coupled to the front end portion of a main frame 2 to rotatably journal a steering stem 7a. A steering handle 7 is attached to the upper portion of the steering stem 7a, and a pair of left and right front forks 4 is attached to one lower portion thereof. A front wheel WF is rotatably journaled to the lower end portion of the front fork 4.

A pair of left and right lower frames 5 is connected to the lower side of the main frame 2, and the high-voltage battery 31 (for example, 72 V) supplying power to the electric motor 50 is disposed to be interposed between the left and right lower frames 5. The rear side of the lower frame 5 is bent toward the upside of the vehicle body to be connected to a rear frame 6 that supports a loading room 17 and the like.

A pivot plate 20 with a swing arm pivot 11 is attached to the rear portion of the lower frame 5. A front end portion of a cantilever-type swing arm 12 is swingably journaled to the swing arm pivot 11 to support the rear wheel WR using only the left arm in the width direction of the vehicle. The rear wheel WR is rotatably journaled to the rear portion of the swing arm 12 using an axle 19, and the rear end portion of the swing arm 12 is suspended from the rear frame 6 through a rear shock unit 13.

A motor driver (or a power drive unit (PDU)) 35 is disposed at the lower portion of the swing arm 12 to convert a DC current supplied from the high-voltage battery 31 into an AC current and supply the AC current to the electric motor 50. The power supplied from the motor driver 35 is supplied to the electric motor 50 through three power supply lines L. A first speed reducing gear 46 and a second speed reducing gear 47 of a speed reducing mechanism to be described later are disposed at the rear side of the electric motor 50, and the rear wheel WR is driven by the axle 19 fixed to the second speed reducing gear 47. Further, a smoothing capacitor 36 is disposed around the motor driver 35.

A front cowl 9 as an exterior component is provided at the front side of the vehicle body in the steering handle 7, and a meter unit 8 including a speed meter and the like is attached to the upper portion of the front cowl. A headlamp 10 is provided at the front side of the vehicle body in the front cowl 9. Further, the low floor 9a is provided at the upper portion of the high-voltage battery 31 so that a passenger puts feet thereon, and a seat cowl 15 is provided outside the rear frame 6. A seat 14 is attached to the upper portion of the seat cowl 15 so that the seat is opened or closed through a hinge provided at the front side of the vehicle body. Further, a tail lamp unit 16 is attached to the rear end portion of the seat cowl 15. A center stand 18 with two leg portions spaced from each other in the width direction of the vehicle is attached to the pivot plate 20. The center stand 18 is rotatably journaled to a stand bracket 150 that is coupled to the lower frame 5 at the inside of the pivot plate 20 in the width direction of the vehicle.

A low-voltage battery 30 (for example, 12 V) is disposed at the right side of the head pipe 3 in the width direction of the vehicle to supply power to electric auxiliary machinery such as the headlamp 10 or a control device. The low-voltage battery 30 is charged by the power of the high-voltage battery 31. A DC-DC converter 32 and a contactor box 33 are disposed at the front side of the loading room 17 on the inside of the seat cowl 15, where the DC-DC converter is configured to convert a high voltage (72 V) of the high-voltage battery 31 into a low voltage (12 V) and the contactor box accommodates a fuse, a relay, or the like. Furthermore, a control device (a managing unit (MGU)) 34 is attached to the outside of the right rear frame 6 in the width direction of the vehicle through an attachment stay 34a to control the motor driver 35 and the like.

Figure 10:
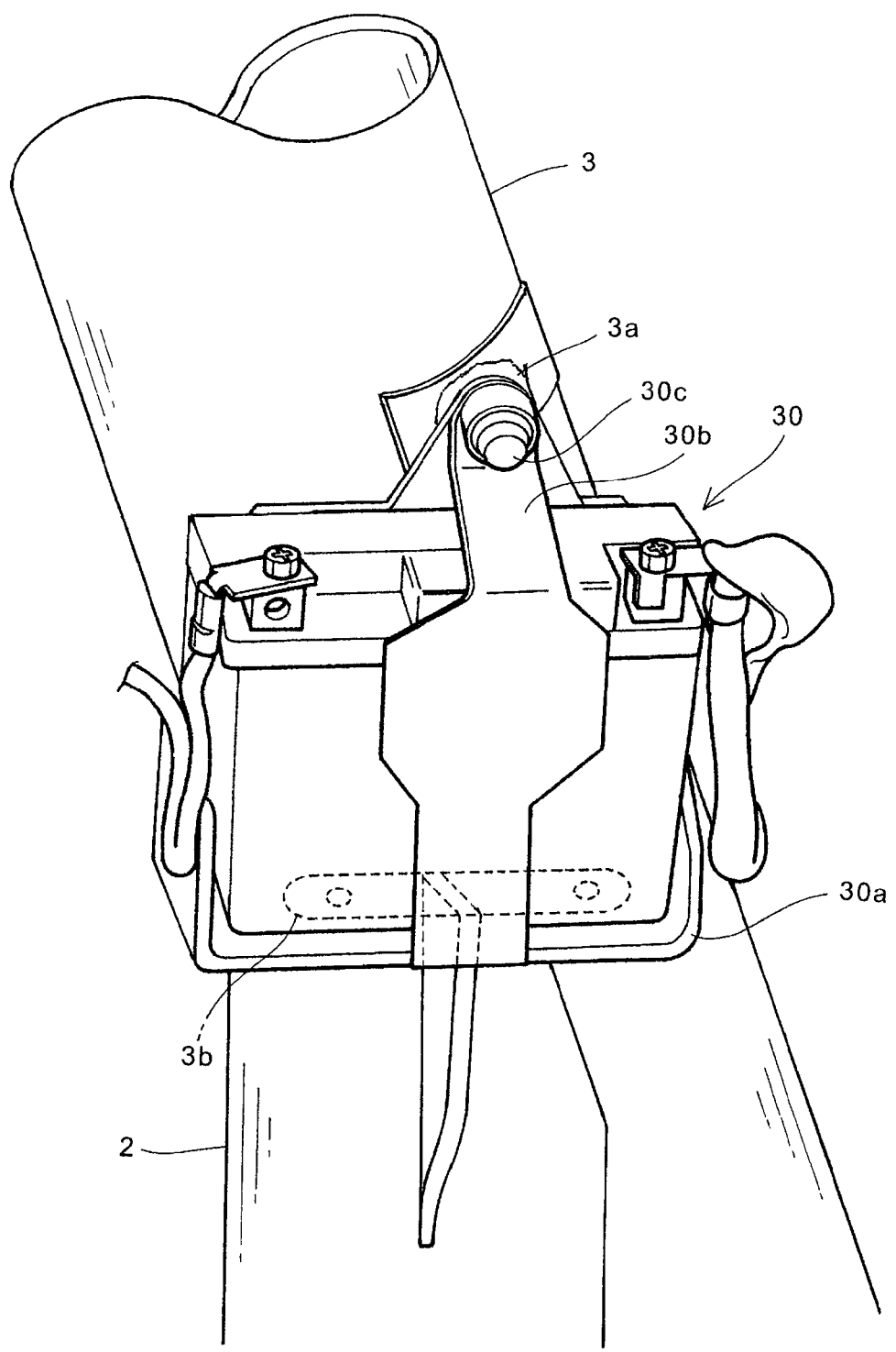
FIG. 10 is a perspective view illustrating attachment structure of a low-voltage battery.

Referring to FIG. 10, the attachment structure of the low-voltage battery 30 will be described. The low-voltage battery 30 is disposed at the side portion of the head pipe 3 while being accommodated in a battery casing 30a. The battery casing 30a is fixed to a lower stay 3b welded to the main frame 2 and an upper stay 3a welded to the head pipe 3. A boss with a screw hole is formed in the upper stay 3a, and the low-voltage battery 30 is disposed at a predetermined position in a manner such that the low-voltage battery 30 is accommodated in the battery casing 30a, and an upper portion of a pressing plate 30b extending from the lower portion of the battery casing 30a is fixed to the upper stay 3a through a fastening screw 30c.

Figure 3:
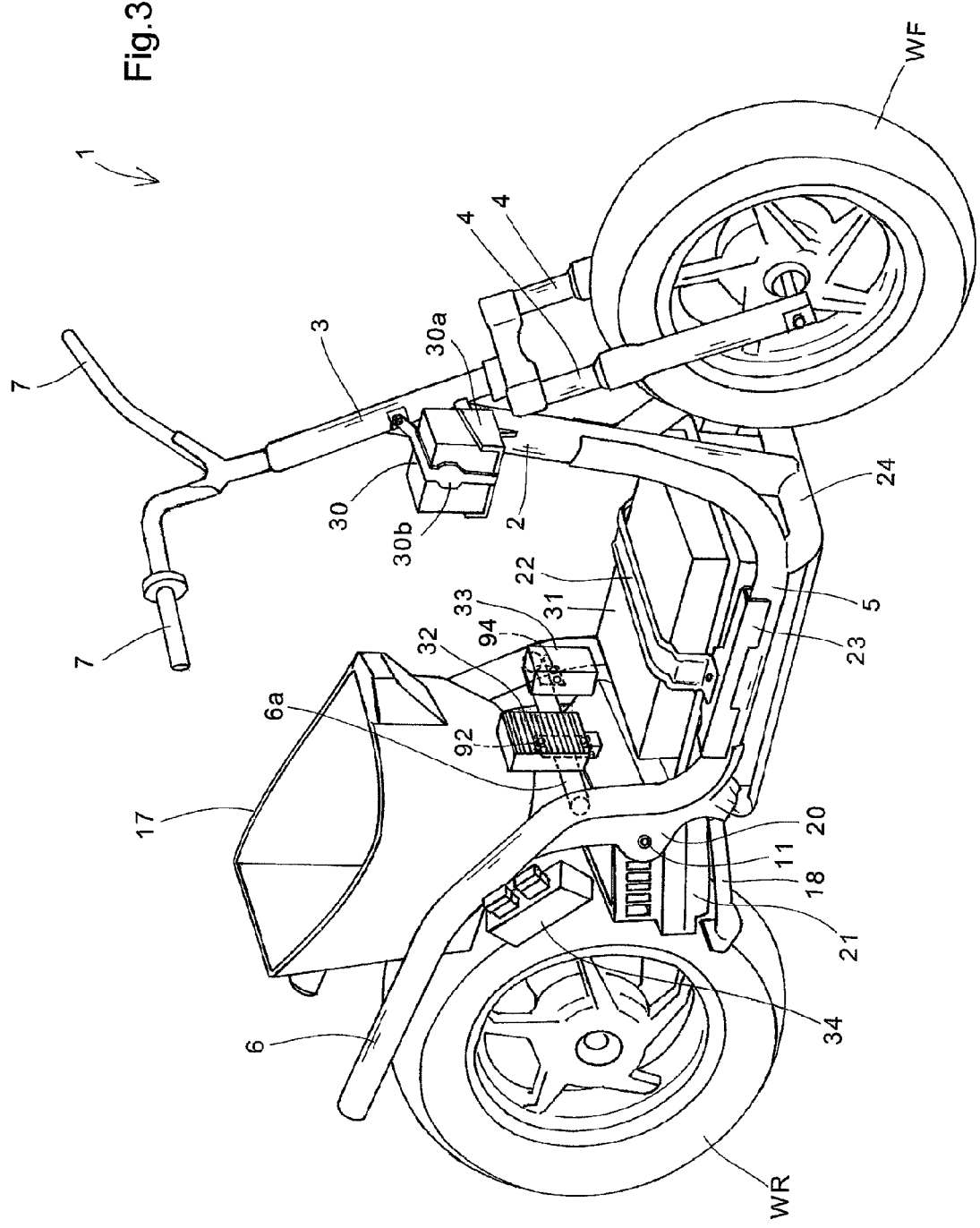
FIG. 3 is a front perspective view illustrating the electric vehicle.
Figure 4:
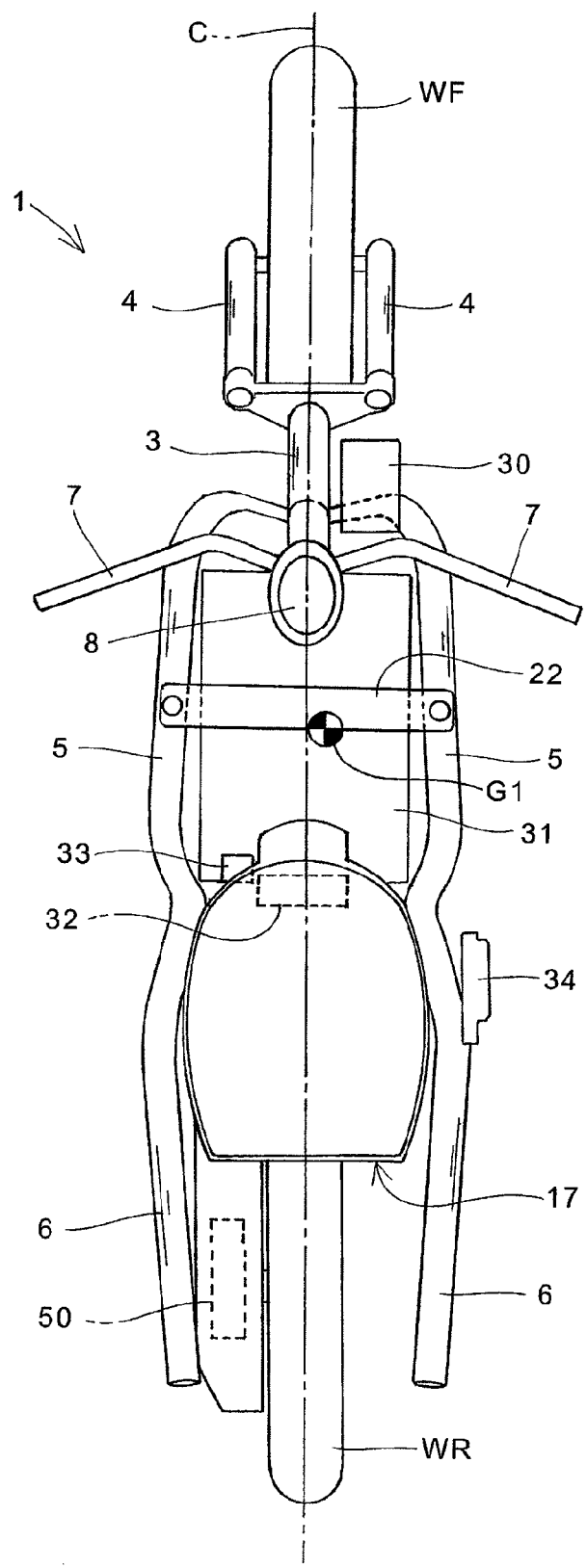
FIG. 4 is a top view illustrating the electric vehicle.

FIG. 3 is a front perspective view illustrating the electric vehicle 1. Further, FIG. 4 is a top view illustrating the electric vehicle 1. The same reference numerals respectively indicate the same or equivalent components. The main frame 2 and the pair of left and right lower frames 5 each formed as an annular pipe material are connected to each other through a reinforcement pipe 24 extending from the lower end portion of the main frame 2 in the width direction of the vehicle. A gusset 23 is welded to the left and right lower frames 5. A holding member 22 is fixed to the gusset 23 through a fastening member such as a screw to hold the high-voltage battery 31.

The loading room 17 is disposed to be interposed between the left and right rear frames 6, and the DC-DC converter 32 and the contactor box 33 are disposed to be close to a sloped portion formed at the front lower portion of the loading room 17. Further, the MGU 34 is attached to the right rear frame 6 in the width direction of the vehicle through the attachment stay 34a.

Figure 11:
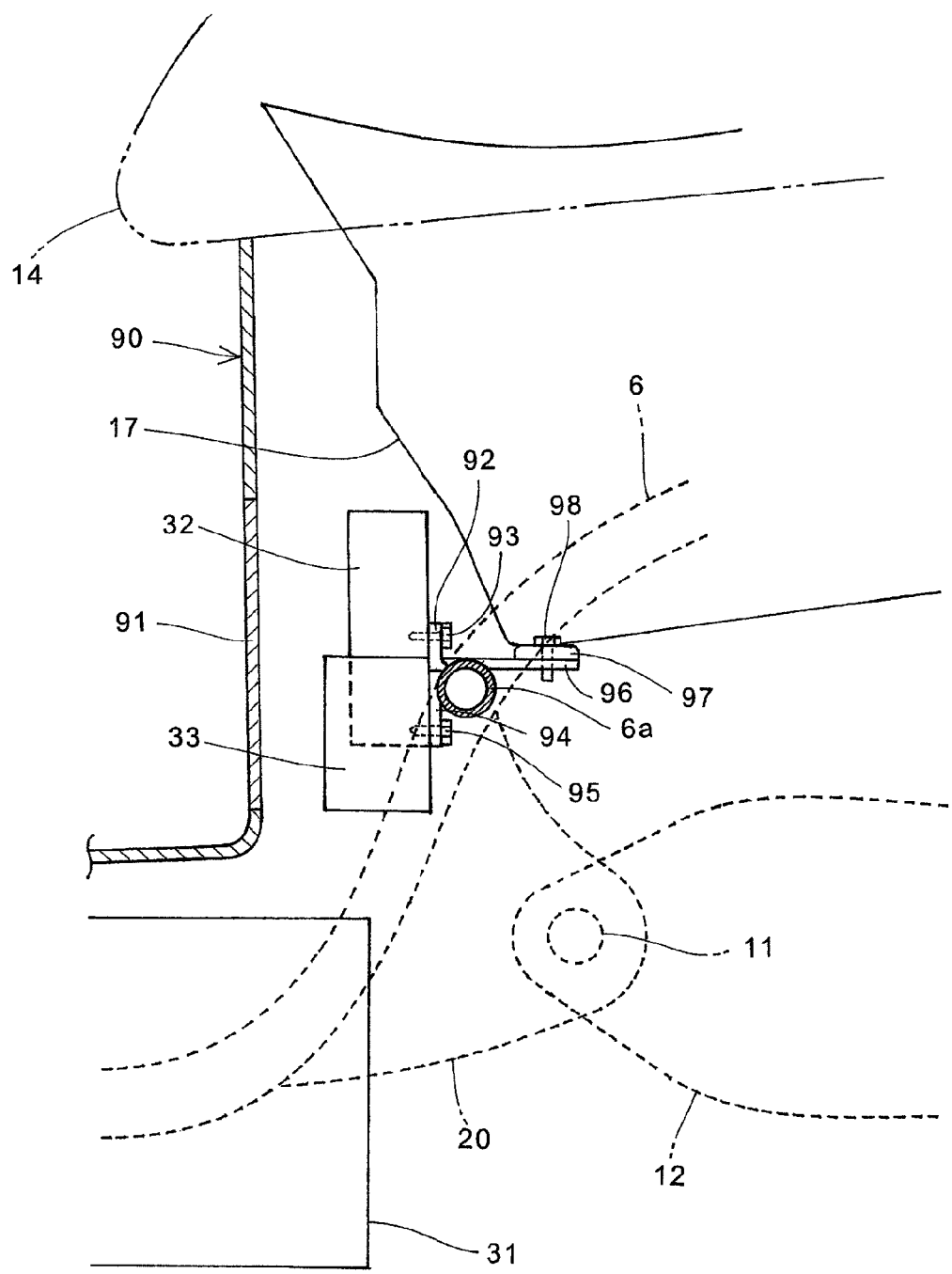
FIG. 11 is a partially enlarged view of FIG. 1.

Referring to FIG. 11, the attachment structure of the DC-DC converter 32 and the like will be described. A cross member 6a is disposed at the rear side of the vehicle body in the DC-DC converter 32 and the contactor box 33 to connect the left and right rear frames 6 to each other. The cross member 6a is attached with an attachment stay 92 supporting the DC-DC converter 32 and having a vertically symmetric shape, an attachment stay 94 extending downward to support the contactor box 33, and an attachment stay 96 extending backward to support the front end portion of the loading room 17.

The DC-DC converter 32 is fixed to the attachment stay 92 through an attachment screw 93 which is threaded thereinto from the rear side of the vehicle body, and the contactor box 33 is fixed to the attachment stay 94 through an attachment screw 95 which is threaded thereinto from the rear side of the vehicle body. Further, the loading room 17 is fixed to an attachment boss 97 and an attachment stay 96 at the front end portion thereof through an attachment screw 98 which is threaded thereinto from the upside. Furthermore, the cross member 6a may be provided with a plurality of support portions for the loading room 17. Further, a maintenance lid 91 is provided at the front side of the vehicle body in the DC-DC converter 32 and the contactor box 33 so that a part of an exterior member 90 is able to be opened or closed.

As described above, the low-voltage battery 30 is disposed at the right side of the head pipe 3. Accordingly, the low-voltage battery 30 is disposed to be offset rightward in the width direction of the vehicle with respect to a vehicle body centerline C. Further, the high-voltage battery 31 is disposed so that a position G1 of the center of gravity thereof is offset rightward in the width direction of the vehicle with respect to the vehicle body centerline C. In the electric vehicle 1 according to the embodiment, the biasing of the weight balance in the width direction of the vehicle is settled in a manner such that the electric motor 50 is disposed to be offset leftward in the width direction of the vehicle on the basis of the examination of the arrangement of the low-voltage battery 30 and the high-voltage battery 31.

Since the electric vehicle 1 has a configuration in which the electric motor 50 is disposed at the arm portion of the cantilever-type swing arm 12, the heavy electric motor 50 is disposed to be offset leftward in the width direction of the vehicle with respect to the vehicle body centerline C, and the weight balance in the width direction of the vehicle is easily biased leftward in the width direction of the vehicle. However, in the embodiment, the position of the center of gravity of the vehicle body may be close to the vehicle body centerline C in a manner such that the low-voltage battery 30 disposed at the front side of the vehicle body is disposed to be offset rightward in the width direction of the vehicle. Further, the position of the center of gravity of the vehicle body may become closer to the vehicle body centerline C in a manner such that the position G1 of the center of gravity of the high-voltage battery 31 is located at the right side in the width direction of the vehicle more than the vehicle body centerline C.

Even when the high-voltage battery 31 is disposed so that the left and right dimensions thereof in the width direction of the vehicle are equivalent to each other with respect to, for example, the vehicle body centerline C, a structure may be applied in which the right side thickness (the longitudinal thickness) in the width direction of the vehicle is set to be larger than the left side thickness so that the position G1 of the center of gravity is disposed to be offset rightward more than the vehicle body centerline C.

Figure 5:
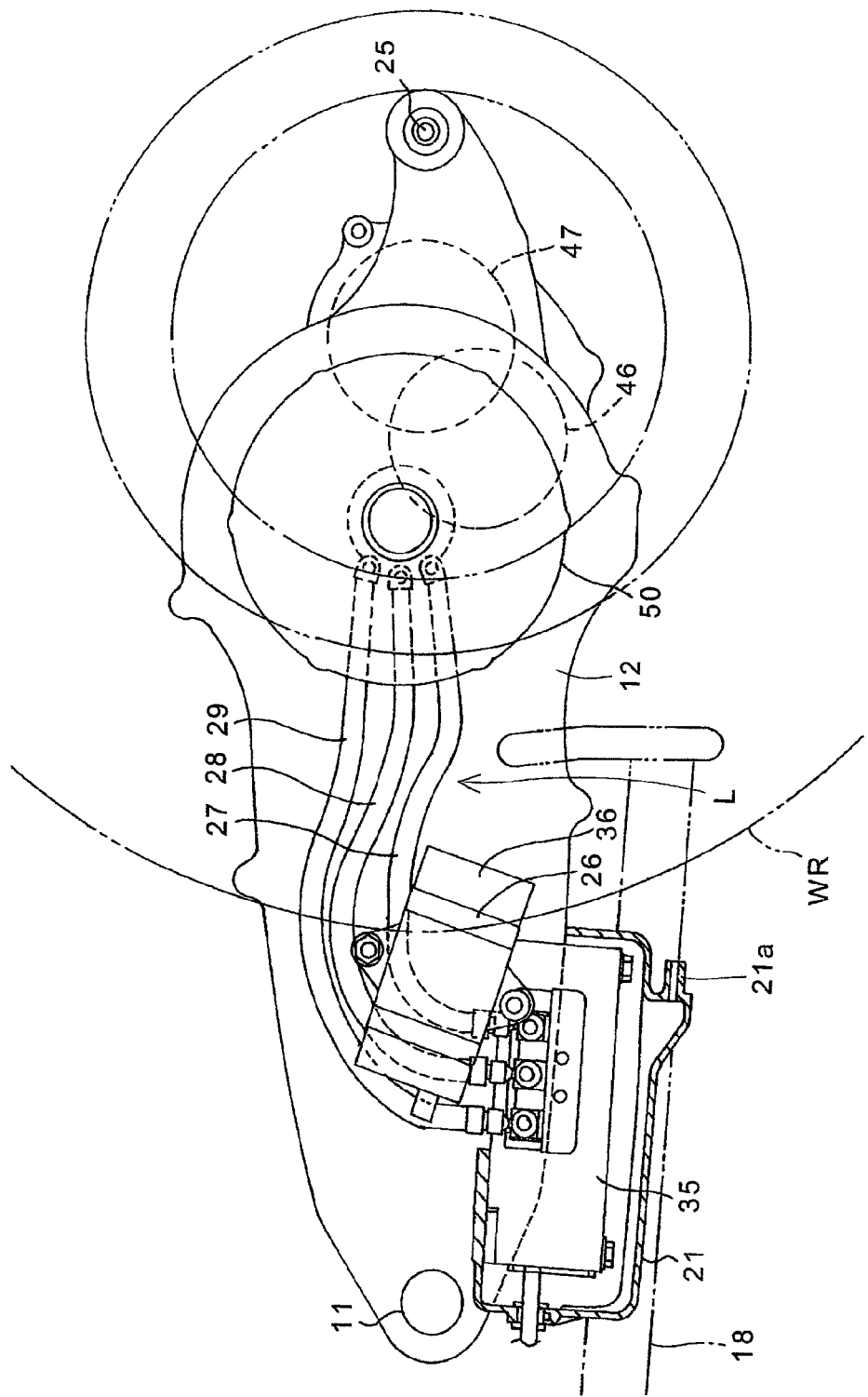
FIG. 5 is a side view illustrating a swing arm.

FIG. 5 is a side view illustrating the swing arm 12. The same reference numerals respectively indicate the same or equivalent components. The motor driver 35 is accommodated in an accommodation space that is provided at the lower surface side of the swing arm 12. The accommodation space is configured in a manner such that a closed space is formed by attaching a cover member 21 from the downside of the vehicle body using a screw or the like. A draining hole 21a is provided at the lower portion of the cover member 21 to discharge moisture to the rear side of the vehicle body.

The end of the cover member 21 at the front side of the vehicle body is projected forward up to the position of the approximate center of the swing arm pivot 11. The motor driver 35 is accommodated in the accommodation space, and is disposed to be closer to the swing arm pivot 11 at the front side of the vehicle body. Accordingly, the heavy motor driver 35 is disposed at the low position of the vehicle body, so that the position of the center of gravity of the electric vehicle 1 may be lowered. Further, since the motor driver is disposed to be close to the swing arm pivot 11, the moment of inertia generated when the swing arm 12 is swung may be made small.

The electric motor 50 is disposed in a space inside the swing arm 12 to overlap the projection area of the rear wheel WR when seen from the side portion of the vehicle body. A U-phase interconnection 27, a V-phase interconnection 28, and a W-phase interconnection 29 serving as power supply lines L are wired between the motor driver 35 and the electric motor 50. The first speed reducing gear 46 and the second speed reducing gear 47 of the speed reducing mechanism are disposed at the rear side of the electric motor 50, and the rear wheel WR is driven by the axle 19 (refer to FIG. 1) which is a rotary shaft of a speed reducing gear 24. Furthermore, a rear shock unit attachment portion 25 is provided in the rear end portion of the swing arm 12 to swingably journal the lower end portion of the rear shock unit 13.

Furthermore, a smoothing capacitor 36 is disposed at the side portion of the motor driver 35 to remove a vibration of a voltage waveform. The substantially cylindrical smoothing capacitor 36 is fixed to the inner wall surface of the swing arm 12 through an attachment stay 26.

As shown in FIG. 1, the electric vehicle 1 includes the center stand 18 which has a rotary shaft thereof in the vehicle body frame. The center stand 18 is configured so that the left leg portion in the width direction of the vehicle contacts the lower surface of the casing member when the center stand is retracted. Accordingly, the cover member 21 may be protected from stones through the center stand 18 when the electric bicycle runs, and the swing arm 12 may be decreased in the weight since there is no need to excessively thicken the cover member 21. A stand stopper 151 is attached to the lower surface of the swing arm 12 to contact rubber members provided at the leg portions of the center stand 18.

Figure 12:
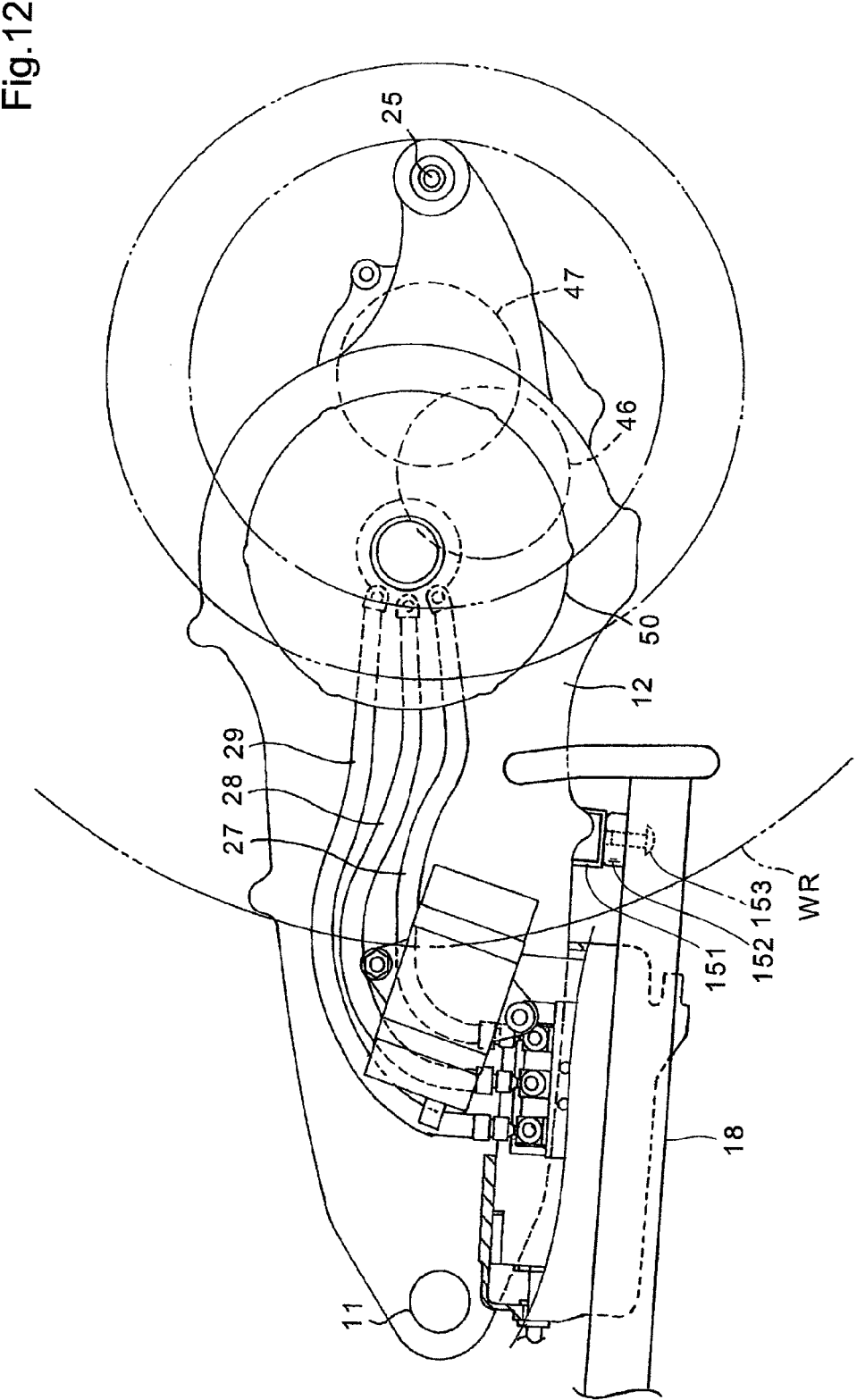
FIG. 12 is a side view illustrating the swing arm when a center stand is retracted.

Referring to FIG. 12, a rubber member 152 is attached to the left leg portion of the center stand 18 in the width direction of the vehicle through an attachment screw 153. A biasing force is applied to the center stand 18 through a spring or the like in the retracting direction, and when the center stand is retracted, the rubber member 152 keeps coming into contact with the stand stopper 151.

Figure 6:
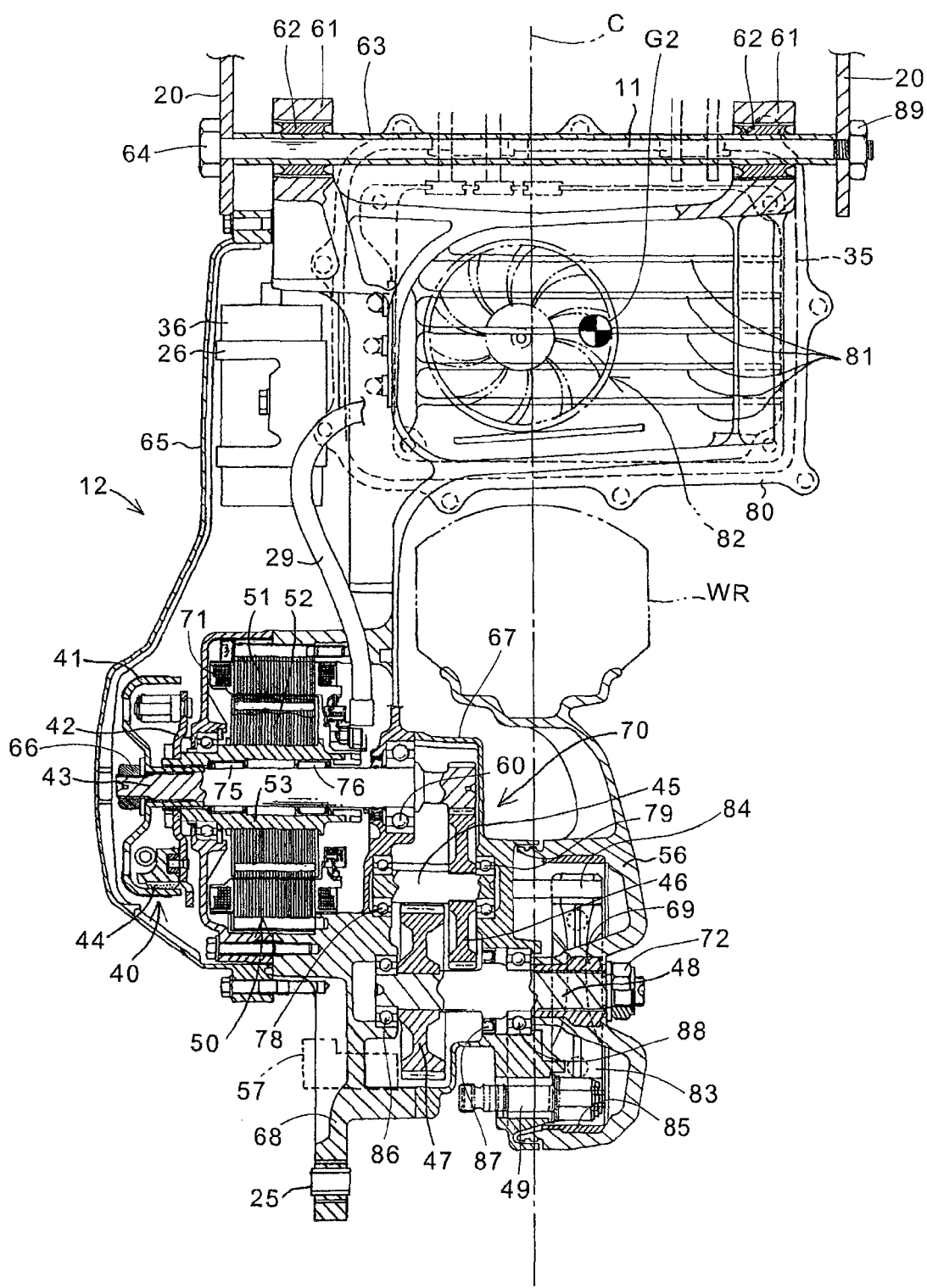
FIG. 6 is a cross-sectional view illustrating the swing arm.

FIG. 6 is a cross-sectional view illustrating the swing arm 12 when seen from the upside of the vehicle body. The same reference numerals respectively indicate the same or equivalent components. The swing arm 12 is swingably journaled to the pair of left and right pivot plates 20 through a swing arm pivot (a pivot shaft) 11. The pivot shaft 11 is an elongated bolt with a screw head 64, and is fixed by a right nut 89 in the width direction of the vehicle while being fitted into a cylindrical collar 63 which is supported by a boss 61 near the swing arm 12 through a bush 62. Furthermore, the bush 62 is welded to the cylindrical collar 63, and a collar member with a small thickness is welded to the outer periphery of the bush 62. Then, the collar member and the bush 62 are press-inserted into the penetration hole of the boss 61, so that the position of the swing arm 12 in the width direction of the vehicle is defined.

A wide casing 80 is provided at the front side of the vehicle body in the swing arm 12 to accommodate the motor driver 35. The cover member 21 (refer to FIG. 1) is attached to the lower surface side of the vehicle body in the wide casing 80. A plurality of heat radiation fins 81 is integrally provided at the upside of the vehicle body in the wide casing 80 to cool the motor driver 35, and an electric fan 82 is disposed at the upside of the vehicle body in the heat radiation fin 81 to improve a cooling effect through compulsory blowing.

As described above, the motor driver 35 is accommodated in the wide casing 80 at the front side of the rear wheel WR. Accordingly, the motor driver 35 is disposed near the front side of the swing arm 12 so that the vehicle body centerline C passing through the front and rear wheels of the electric vehicle 1 is disposed across the width direction of the vehicle. In the electric vehicle 1 according to the embodiment, it is characterized in that the biasing of the weight balance in the width direction of the vehicle is settled by disposing the electric motor 50 to be offset leftward in the width direction of the vehicle on the basis of the examination of the arrangement of the motor driver 35.

Since the electric vehicle 1 has a configuration in which the electric motor 50 is disposed at the arm portion of the cantilever-type swing arm 12, the heavy electric motor 50 is disposed to be offset leftward in the width direction of the vehicle with respect to the vehicle body centerline C, and the weight balance in the width direction of the vehicle is easily biased leftward in the width direction of the vehicle. However, in the embodiment, the motor driver 35 is disposed across the vehicle body centerline C, and the position G2 of the center of gravity of the motor driver 35 is disposed at the right side in the width direction of the vehicle, so that the position of the center of gravity of the vehicle body may become closer to the vehicle body centerline C.

With the above-described configuration, it is possible to reduce a burden on the swing arm pivot by improving the weight balance in the width direction of the vehicle compared to, for example, a configuration in which both the electric motor and the motor driver are disposed to be offset in the same direction with respect to the vehicle body centerline.

The swing arm 12 according to the embodiment is of a cantilever type that journals the rear wheel WR only using the left arm portion, and the electric motor 50, a centrifugal clutch 40 serving as a disconnection/connection mechanism of the rotational driving force, and a speed reducing mechanism 70 are intensively disposed at the rear side of the vehicle body in the arm portion.

The electric motor 50 is configured as an inner rotor type including a stator 51 which is fixed to the inner wall of the swing arm 12 and has a stator coil 71 and a rotor 52 which is fixed to a motor driving shaft 53. The centrifugal clutch 40 includes a drive plate 42 which is provided with a clutch shoe 44 and a clutch outer 41 which is rotated by a friction force of the clutch shoe 44. The drive plate 42 is fixed to the left end portion of the motor driving shaft 53 shown in the drawing, and the clutch outer 41 is fixed to an output shaft 43, rotatably inserted through the motor driving shaft 53, through a nut 66. Furthermore, the motor driving shaft 53 and the output shaft 43 are configured to be rotatable relative to each other through two needle roller bearings 75 and 76.

Then, the centrifugal clutch 40 has a configuration in which the clutch shoe 44 moves outward in the radial direction to generate a friction force when the motor driving shaft 53 rotates at a predetermined rpm or more, that is, the drive plate 42 rotates at a predetermined rpm or more, so that the clutch outer 41 is rotated by the friction force. Accordingly, a rotational driving force of the electric motor 50 is transmitted to the output shaft 43.

The rotational driving force transmitted to the output shaft 43 is transmitted to a final output shaft 48 (the axle 19) through the speed reducing mechanism 70. Specifically, the rotational driving force is transmitted to the final output shaft 48 which is fixed to the second speed reducing gear 47 and is rotatably journaled through a bearing 86 fitted to the power transmission casing 68 and a bearing 88 fitted to a speed reducing gear casing 67 after the rotational driving force is transmitted via the first speed reducing gear 46 which meshes with the speed reducing gear provided in the right end portion of the output shaft 43 shown in the drawing, a first speed reducing shaft 45 which is fixed to the first speed reducing gear 46 and is rotatably journaled through a bearing 79 fitted to the speed reducing gear casing 67 and a bearing 78 fitted to the power transmission casing 68, and the second speed reducing gear 47 which meshes with a speed reducing gear provided in the first speed reducing shaft 45.

A wheel 56 of the rear wheel WR is fixed to the right end portion of the final output shaft 48 shown in the drawing through a collar 69 by a nut 72. A brake drum with a liner 85 is formed at the inner diameter side of the wheel 56, and a pair of upper and lower brake shoes 83 is accommodated therein which is driven by a brake cam 49 about an anchor pin 84. Furthermore, an oil seal 87 is disposed at the left side of the bearing 88 shown in the drawing. Further, an integral swing arm casing 65 is attached to the outside of the smoothing capacitor 36 or the centrifugal clutch 40 in the width direction of the vehicle.

The integral swing arm casing 65 is attached to the outside of the smoothing capacitor 36 or the centrifugal clutch 40 in the width direction of the vehicle. Further, a non-contact type vehicle speed sensor 57 is disposed near the right side of the second speed reducing gear 47 shown in the drawing to detect a vehicle speed on the basis of the rotation speed of the second speed reducing gear 47.

Figure 7:
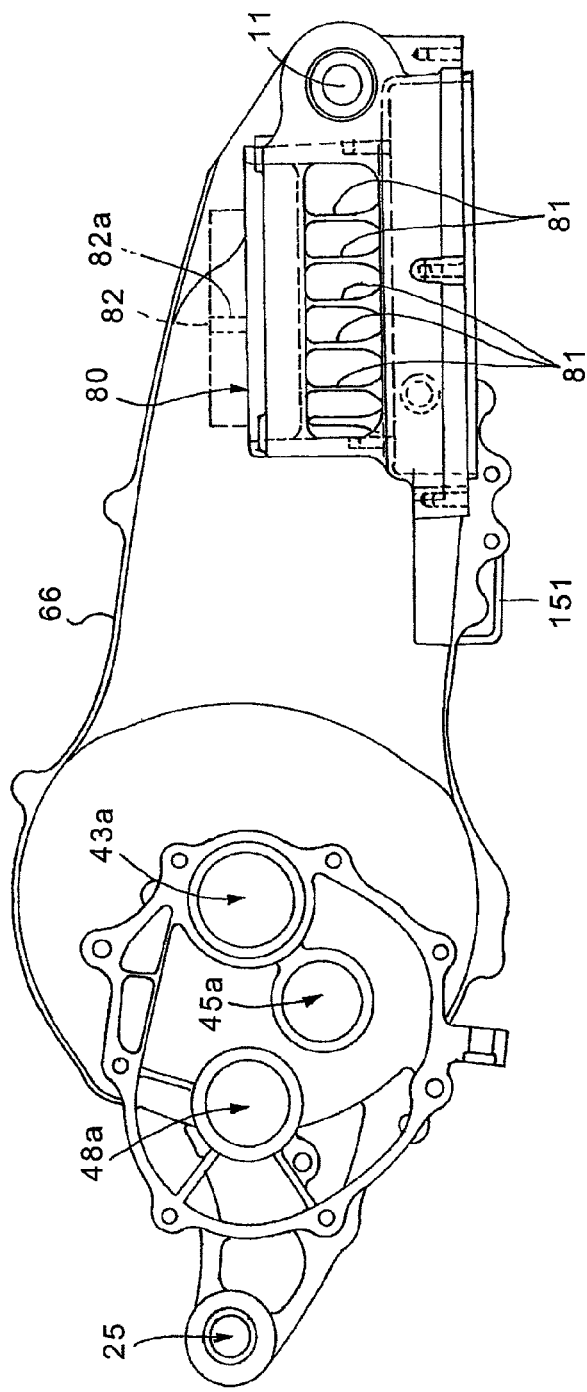
FIG. 7 is a side view illustrating a power transmission casing constituting the swing arm.

FIG. 7 is a side view illustrating a power transmission casing 66 constituting the swing arm 12. This drawing illustrates a state where the power transmission casing is seen from the right side in the width direction of the vehicle. The same reference numerals respectively indicate the same or equivalent components. The rear side of the power transmission casing 66 is provided with a first penetration hole 43a into which the output shaft 43 (refer to FIG. 7) is inserted through the bearing 60, a second penetration hole 45a which is coaxially formed with the first speed reducing shaft 45, and a third penetration hole 48*a* which is coaxially formed with the final output shaft 48.

Then, the wide casing 80 is integrally formed with the front side of the power transmission casing 66 to accommodate the motor driver 35. As described above, the accommodation space of the motor driver 35 is formed by attaching the cover member 21 (refer to FIG. 5) to the downside of the wide casing 80. The heat radiation fins 81 are integrally formed with the wide casing 80 to be upright from the downside of the vehicle body toward the upside thereof.

The electric fan 82 is attached to the upper portions of the plurality of heat radiation fins 81. A rotary shaft 82*a* of the electric fan 82 is disposed in the vertical direction of the vehicle body, and it is configured such that air blows in the upward direction of the vehicle body by a plurality of blade members attached to the rotary shaft 82*a* when a current is supplied to the motor. Accordingly, it is possible to efficiently cool the motor driver 35, which is heated up to a high temperature during the operation, using the heat radiation fins 81.

Figure 8:
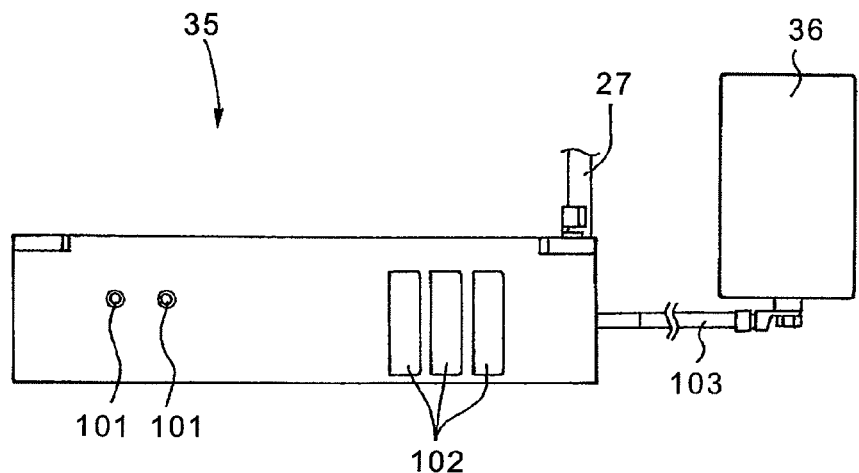
FIG. 8 is a front view illustrating a motor driver.
Figure 9:
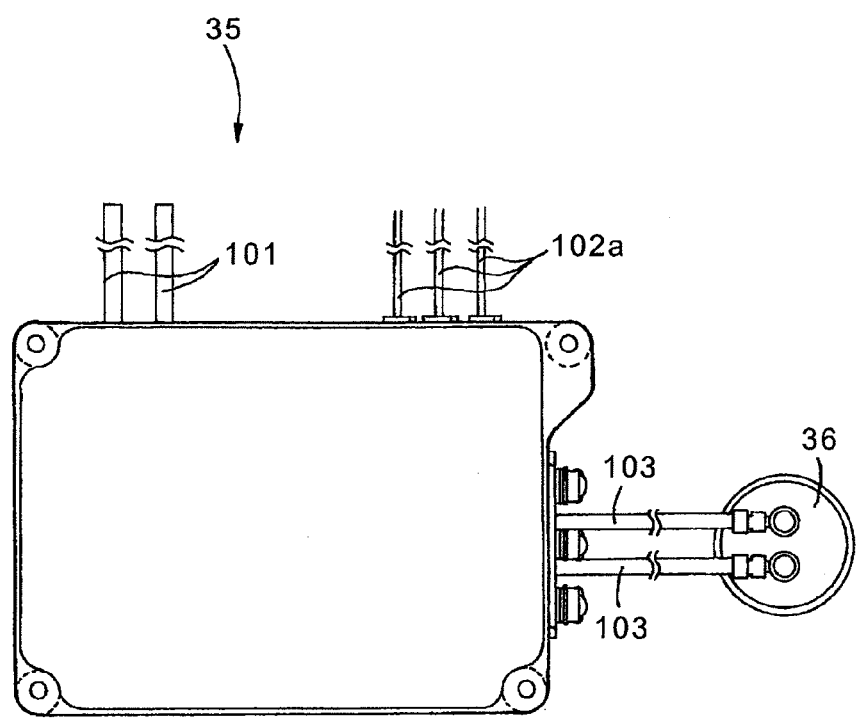
FIG. 9 is a bottom view illustrating the motor driver.

FIG. 8 is a front view illustrating the motor driver 35 when seen from the front side of the vehicle body, and FIG. 9 is a bottom view illustrating the motor driver 35 when seen from the downside of the vehicle body. The same reference numerals respectively indicate the same or equivalent components. A U-phase interconnection 27, a V-phase interconnection 28, and a W-phase interconnection 29 (refer to FIG. 5) are wired at the left side surface (the right end surface shown in the drawing) of the motor driver 35 in the width direction of the vehicle to extend backward from the swing arm 12 and supply power to the electric motor 50. Further, two power supply lines 101 extending from the high-voltage battery 31 and three signal lines 102*a* receiving a driving signal from the MGU 34 are connected to the end surface at the front side of the vehicle body in the motor driver 35. The signal lines 102*a* are inserted into the motor driver 35 through a waterproof/vibration-proof rubber 102. Further, two connection lines 103 are connected to the right end surface shown in the drawing to respectively input and output power to and from the smoothing capacitor 36.

As described above, according to the electric vehicle 1 of the present invention, since the motor driver 35 is disposed across the vehicle body centerline C and the motor driver 35 is disposed so that the position G2 of the center of gravity of the motor driver 35 is offset rightward more than the vehicle body centerline C in the vehicle in which the electric motor 50 is disposed to be offset leftward in the width direction of the vehicle more than the vehicle body centerline C, the weight balance easily biased leftward in the width direction of the vehicle may become close to the vehicle body centerline C through the arrangement structure of the low-voltage battery 30. With the above-described configuration, it is possible to reduce a burden on the swing arm pivot by improving the weight balance in the width direction of the vehicle compared to, for example, a configuration in which both the electric motor and the motor driver are disposed to be offset in the same direction with respect to the vehicle body centerline.

As described above, according to the electric vehicle 1 of the present invention, since the low-voltage battery 30 is disposed at the right side of the head pipe 3 in the vehicle in which the electric motor 50 is disposed to be offset leftward in the width direction of the vehicle more than the vehicle body centerline C, the weight balance biased leftward in the width direction of the vehicle may become close to the vehicle body centerline C through the arrangement structure of the low-voltage battery 30. Further, since the electric motor is disposed at the rear side of the vehicle body, whereas the heavy low-voltage battery 30 is disposed at the front side of the vehicle body, the weight balance in the longitudinal direction of the vehicle body may be settled.

Furthermore, the shapes or the structures of the swing arm, the electric motor, the motor driver, the low-voltage battery, the high-voltage battery, and the like, the arrangement relationship between the low-voltage battery and the high-voltage battery, and the like are not limited to the above-described embodiment, and may be modified into various forms. For example, the low-voltage battery may be disposed to be offset rightward more than the vehicle body centerline at the downside of the head pipe or the upside of the high-voltage battery. Furthermore, the swing arm may be configured as a cantilever type having an arm portion only at the right side of the vehicle body, the electric motor may be accommodated at the rear portion of the arm portion, and the low-voltage battery may be provided at the left side of the head pipe. The electric vehicle according to the present invention is not limited to the electric bicycle, and may be applied to a tricycle or a quadricycle.

Figure 13:
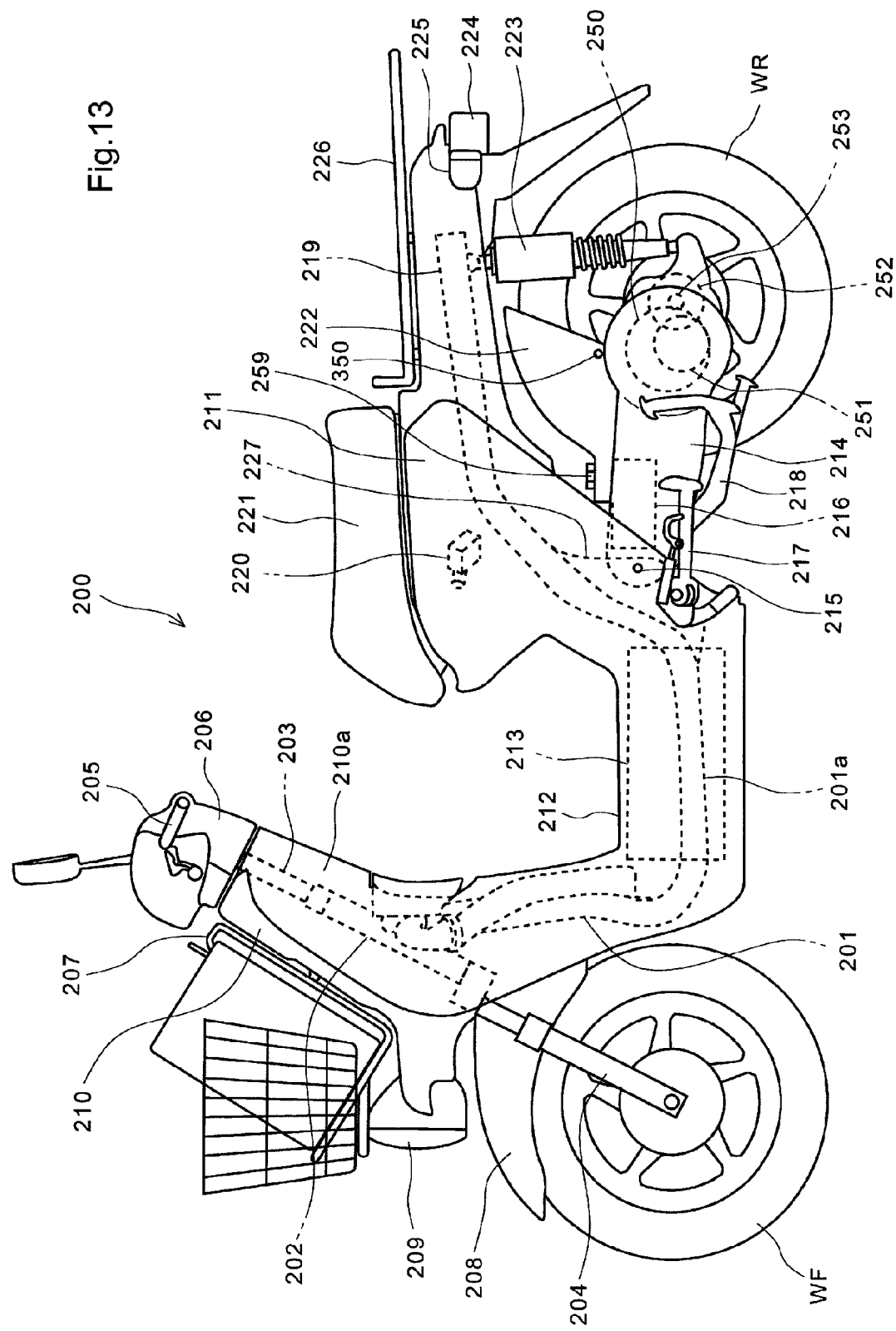
FIG. 13 is a side view illustrating an electric vehicle according to a second embodiment of the present invention.

FIG. 13 is a side view illustrating an electric vehicle 200 according to a second embodiment of the present invention. The electric vehicle 200 has the same basic structure as that of the electric vehicle 1 of the first embodiment, and has similarities in that a motor driver 216 is disposed across the vehicle body centerline C at the rear side of the swing arm pivot (the swing shaft) 215 and the position G2 of the center of gravity of the motor driver 216 is located at the right side in the width direction of the vehicle more than the vehicle body centerline C in a vehicle in which an electric motor 250 is disposed around an axle 253 of a cantilever-type swing arm 214.

The main difference with the electric vehicle 1 of the first embodiment is that the motor driver 216 is attached to a recess 308 opened to the upper surface side of the swing arm 214 be inserted thereinto from the upside, an attachment portion 306 is provided at a cover member 264 of the motor driver 216 to attach the motor driver 216 to the swing arm 214, a center stand 218 is attached to the lower surface of the swing arm 214, and a fender (a dust guard) of the rear wheel WR is attached to the upper surface of the motor driver 216. Furthermore, the configuration applied to the electric vehicle 200 may be appropriately applied to the electric vehicle 1 according to the first embodiment.

The electric vehicle 200 is a scooter-type electric bicycle with a lower floor 212, and is configured to drive the rear wheel WR using a rotational driving force of the electric motor 250 built in the swing arm 214. A high-voltage battery 213 supplying power to the electric motor 250 may be charged in a manner such that an external power supply is connected to a charging port 220 provided below a seat 221.

A head pipe 202 is coupled to the front end portion of a main frame 201 to rotatably journal a steering stem 203. A steering handle 205 is attached to the upper portion of the steering stem 203, and a pair of front forks 204 is attached to one lower portion thereof. The front wheel WF is rotatably journaled to the lower end portion of the front fork 204.

A pair of left and right lower frames 201*a* is connected to the lower side of the main frame 201, and a high-voltage battery 213 is disposed to be interposed between the left and right lower frames 201*a*. The rear side of the lower frame 201*a* is bent toward the upside of the vehicle body to be connected to a rear frame 219.

A pivot plate 227 with a swing arm pivot 215 is attached to the rear portion of the lower frame 201*a*. A front end portion of a cantilever-type swing arm 214 is swingably journaled to the swing arm pivot 215 to support the rear wheel WR using only the left arm in the width direction of the vehicle. The rear wheel WR fixed to the axle 253 is rotatably journaled to the rear portion of the swing arm 214. The rear end portion of the swing arm 214 is suspended on the rear frame 219 using a rear shock unit 223.

The motor driver (PDU) 216 is disposed at the front side of the vehicle body in the swing arm 214 to convert a DC current supplied from the high-voltage battery 213 into an AC current and supply the AC current to the electric motor 250. The power supplied from the motor driver 216 is supplied to the electric motor 250 through three power supply lines (refer to FIG. 14). A first speed reducing gear 251 and a second speed reducing gear 252 of a speed reducing mechanism to be described later are disposed at the rear side of the electric motor 250, and the rear wheel WR is driven by the axle 253 fixed to the second speed reducing gear 252.

The center of the vehicle body in the steering handle 205 is covered with a handle cover 206. The head pipe 202 is covered with a front cowl 210 disposed at the front side of the vehicle body and a floor cover 210a disposed at the rear side of the vehicle body. A carrier 207 is disposed at the front side of the front cowl 210, and a headlamp 209 is supported by a front end extending to the front side of the vehicle body below the carrier 207. A front fender 208 of the front wheel WF is attached to the lower side of the headlamp 209.

The low floor 212 is provided at the upper portion of the high-voltage battery 213 so that a rider puts feet thereon, and the outside of the rear frame 219 is covered with the seat cowl 211. The seat 221 is attached to the upper portion of the seat cowl 211 so that the seat is opened or closed through a hinge provided at the front side of the vehicle body. A carrier 226 is fixed to the rear side of the seat 221, and a tail lamp unit 224 and a pair of left and right turn indicator units 225 are attached to the rear end portion of the seat cowl 211. A rear fender 222 of the rear wheel WR is attached to the upper surface of the swing arm 214 using fastening members 259 and 350 such as a bolt.

A side stand 217 is rotatably supported to the left pivot plate 227 in the width direction of the vehicle. A center stand 218 with two leg portions spaced from each other in the width direction of the vehicle is rotatably attached to the lower portion of the swing arm 214.

Figure 14:
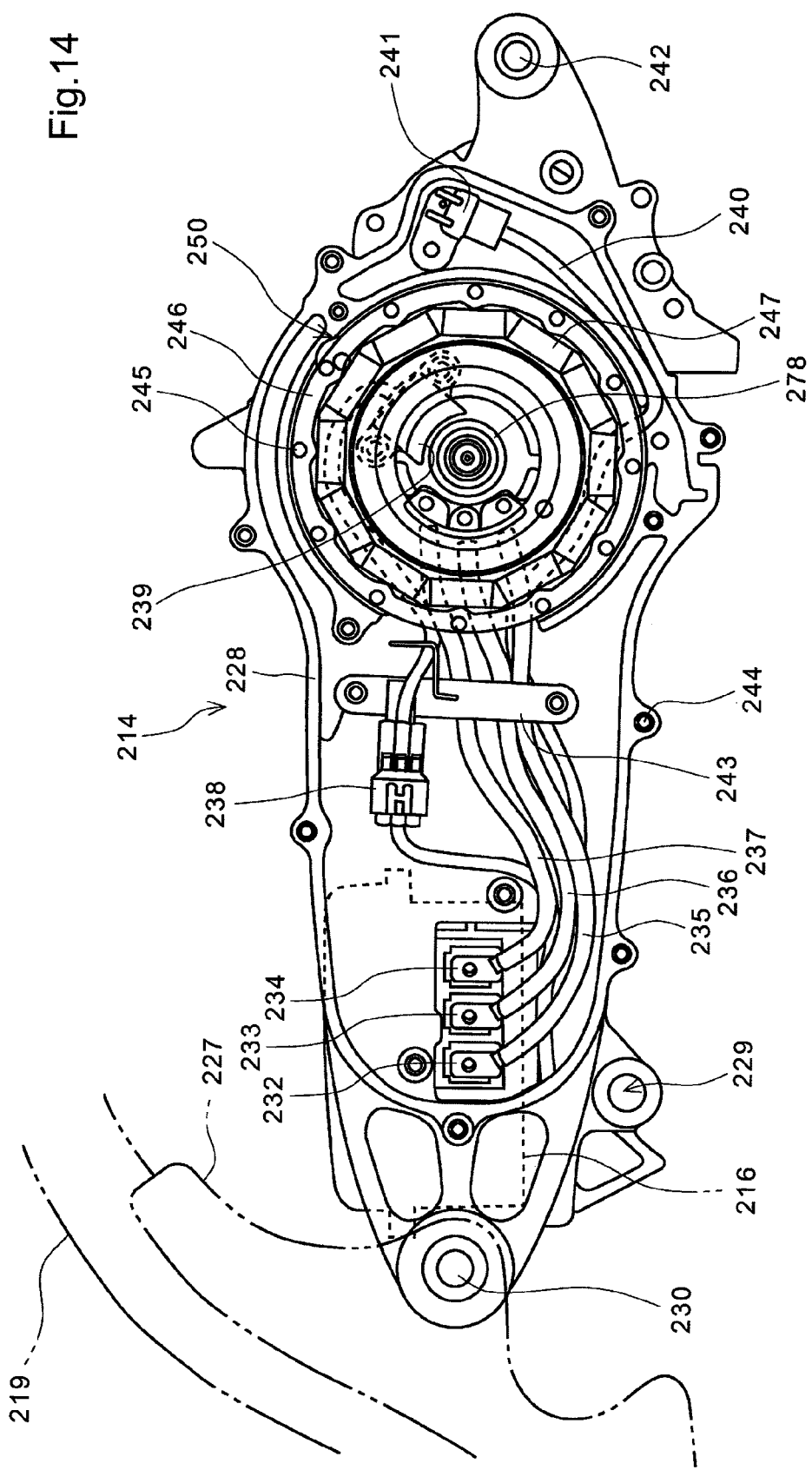
FIG. 14 is a side view illustrating a swing arm.

FIG. 14 is a side view illustrating the swing arm 214. The same reference numerals respectively indicate the same or equivalent components. This drawing illustrates a state where a swing arm cover 276 (refer to FIG. 22), attached to the left side of an power transmission casing 228 in the width direction of the vehicle, is detached from the power transmission casing 228 supporting a main component such as the electric motor 250. A plurality of bolt fastening holes 244 is formed in a surface at the outer periphery of the power transmission casing 228 contacting the swing arm cover 214. A penetration hole 230 is formed in the front end portion of the power transmission casing 228 so that a pivot shaft passes therethrough. The motor driver 216 is accommodated in an accommodation space with an opening at the upper surface side of the swing arm 214. The motor driver 216 is accommodated in the accommodation space, and is disposed to be closer to the swing arm pivot 215 at the front side of the vehicle body. In the embodiment, the motor driver 216 is configured so as not to protrude from the lower surface of the swing arm 214.

The electric motor 250 is disposed in a space inside the swing arm 214 to overlap the projection area of the rear wheel WR when seen from the side portion of the vehicle body. A U-phase interconnection 235, a V-phase interconnection 236, and a W-phase interconnection 237 serving as power supply lines are wired between the motor driver 216 and the electric motor 250. The three interconnections are connected to the motor driver 216 through terminals 232, 233, and 234. Further, the three interconnections are close to the inner wall through a guide plate 243 attached to the power transmission casing 228.

The electric motor 250 is configured as an inner rotor type including a stator 247 which is fixed to a stator casing 246 through a fastening member 245 and a rotor 248 (refer to FIG. 20) which is fixed to a motor driving shaft 278. A rotation speed sensor 239 of the electric motor 250 is disposed at the outer periphery of the motor driving shaft 278. A connector 238 of the rotation speed sensor 239 is supported to the guide plate 243. Further, A vehicle speed sensor 241 is disposed at the rear side of the vehicle body in the electric motor 250 to detect the rotation speed of the second speed reducing gear 252 (refer to FIG. 22) fixed to the axle 253. An interconnection 240 of the vehicle speed sensor 241 is also configured to pass through the right side of the guide plate 243 in the width direction of the vehicle.

An attachment portion 229 of the center stand 218 is provided at the lower portion of the power transmission casing 228. Further, a lower support portion 242 is provided at the rear end portion of the power transmission casing 228 to swingably journal the lower end portion of the rear shock unit 223.

Figure 15:
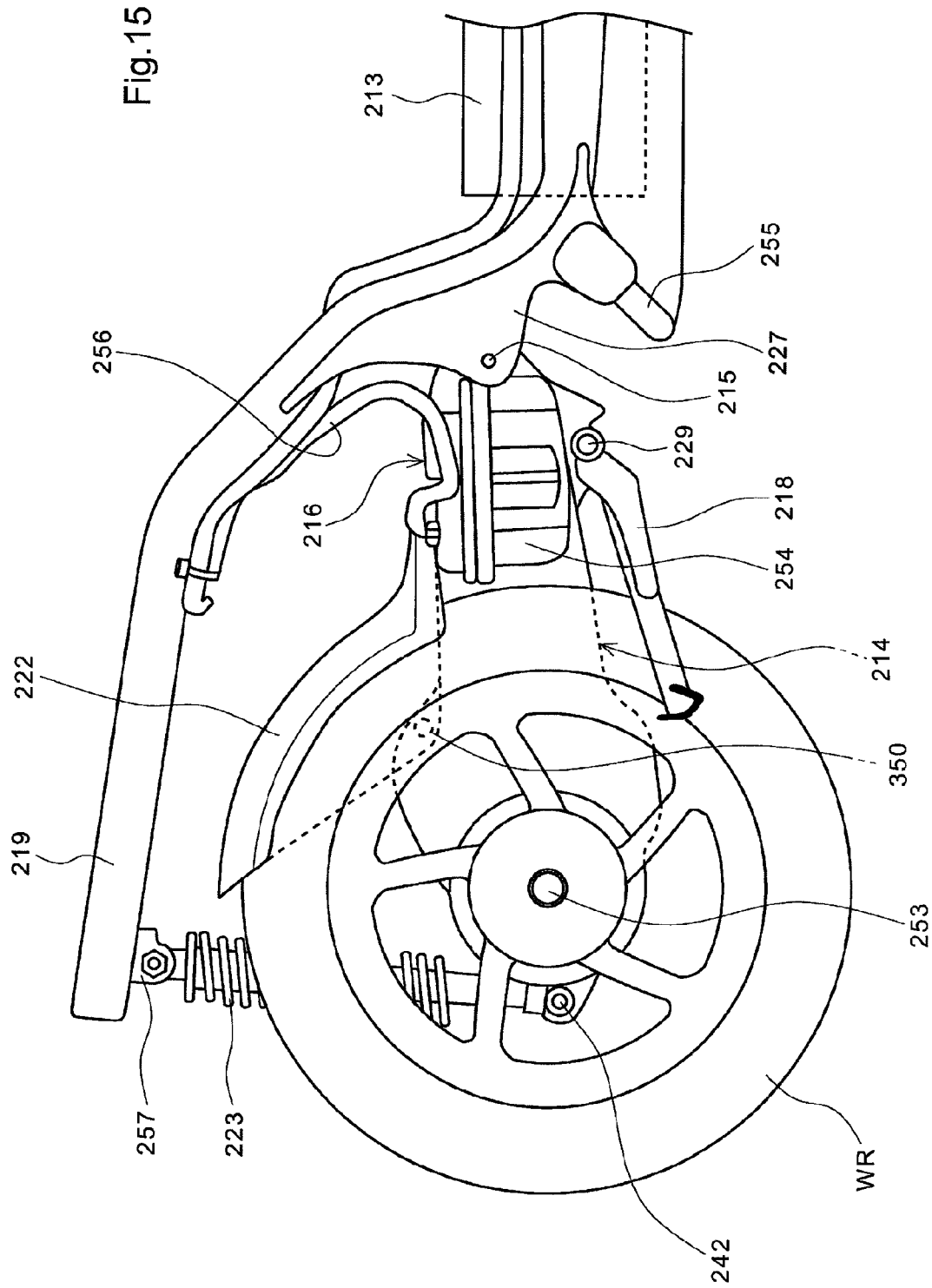
FIG. 15 is a partially enlarged view when the electric vehicle is seen from the right side of the vehicle body.
Figure 16:
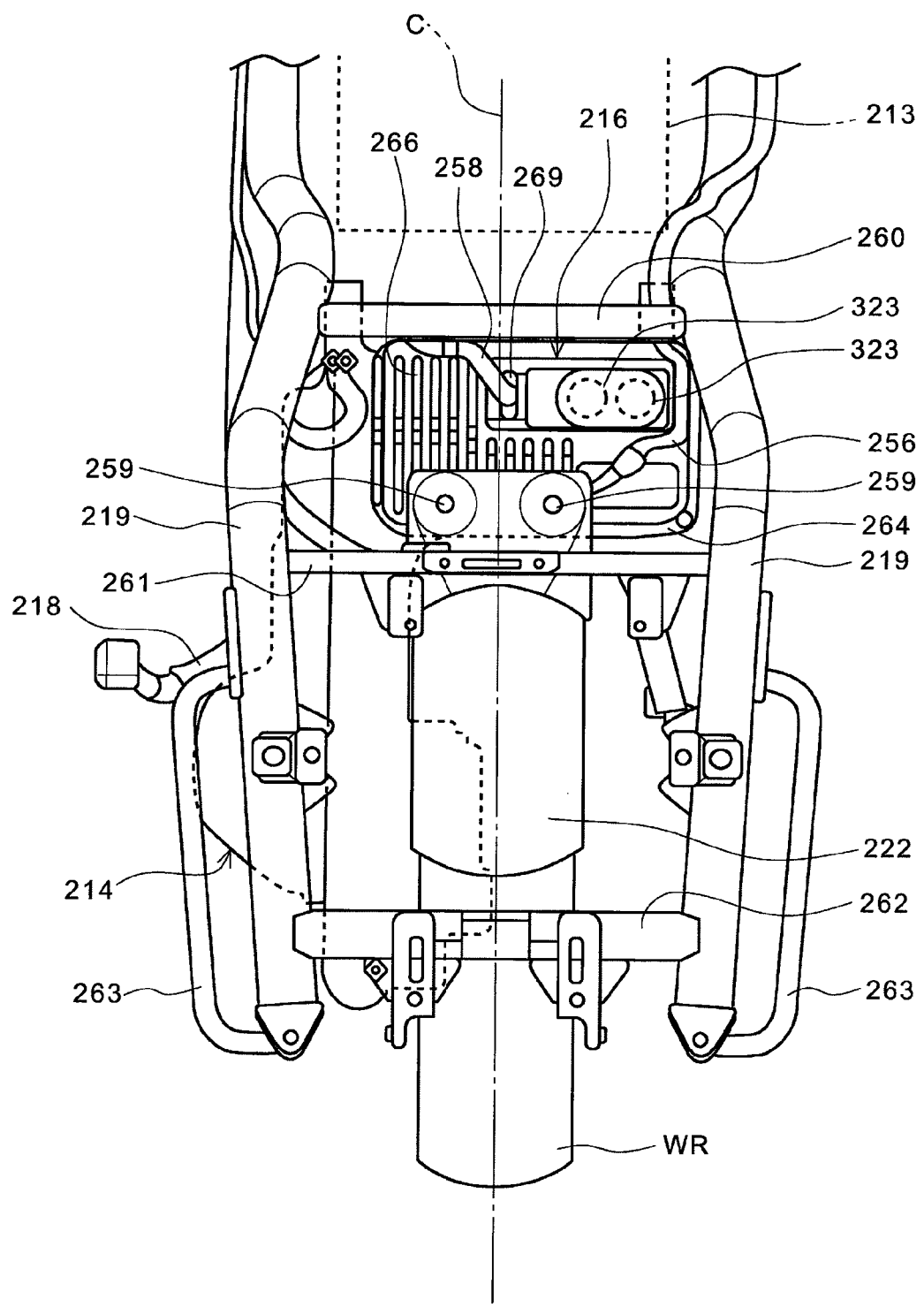
FIG. 16 is a partially enlarged view when the electric vehicle is seen from the upside thereof.

FIG. 15 is a partially enlarged view when the electric vehicle is seen from the right side of the vehicle body. Further, FIG. 16 is a partially enlarged view when the electric vehicle is seen from the upside thereof. The same reference numerals respectively indicate the same or equivalent components. A wide casing 254 is provided at the front side of the vehicle body in the swing arm 214 to form a recess for accommodating the motor driver 216. The attachment portion 229 journaling the center stand 218 is located at the approximate center of the wide casing 254 in the longitudinal direction of the vehicle body.

The rear shock unit 223 is attached between an upper support portion 257 provided at the rear frame 219 and a lower support portion 242 provided at the rear end portion of the swing arm 214. A sub-frame 255 is connected to the lower portion of the pivot plate 227 at the front side of the vehicle body to support the high-voltage battery 213.

Referring to FIG. 16, a pair of left and right rear frames 219 in the width direction of the vehicle is connected to each other through a first connection bar 260 located at the front side of the vehicle body in the motor driver 216 when seen from the upside of the vehicle body, a second connection bar 261 located at the rear end of the motor driver 216 when seen from the upside of the vehicle body, and a third connection bar 262 located near the axle of the rear wheel WR when seen from the upside of the vehicle body. A loading grip 263 is attached to the outside of the rear frame 219 in the width direction of the vehicle.

A control system harness 256 and a power system harness 258 are connected to the upper surface portion of the motor driver 216. Further, the rear fender 222 is fixed to the motor driver 216 to cover the front side and the upside of the rear wheel WR. The rear fender 222 has a horizontally asymmetric shape in which only the left side in the width direction of the vehicle extends backward along the upper surface of the power transmission casing 228. The rear fender 222 is fixed to the swing arm 214 through one fastening member 350 directed in the width direction of the vehicle and penetrating the end portion of the extension portion and two fastening members 259 fixed to the upper surface of the motor driver 216.

Figure 17:
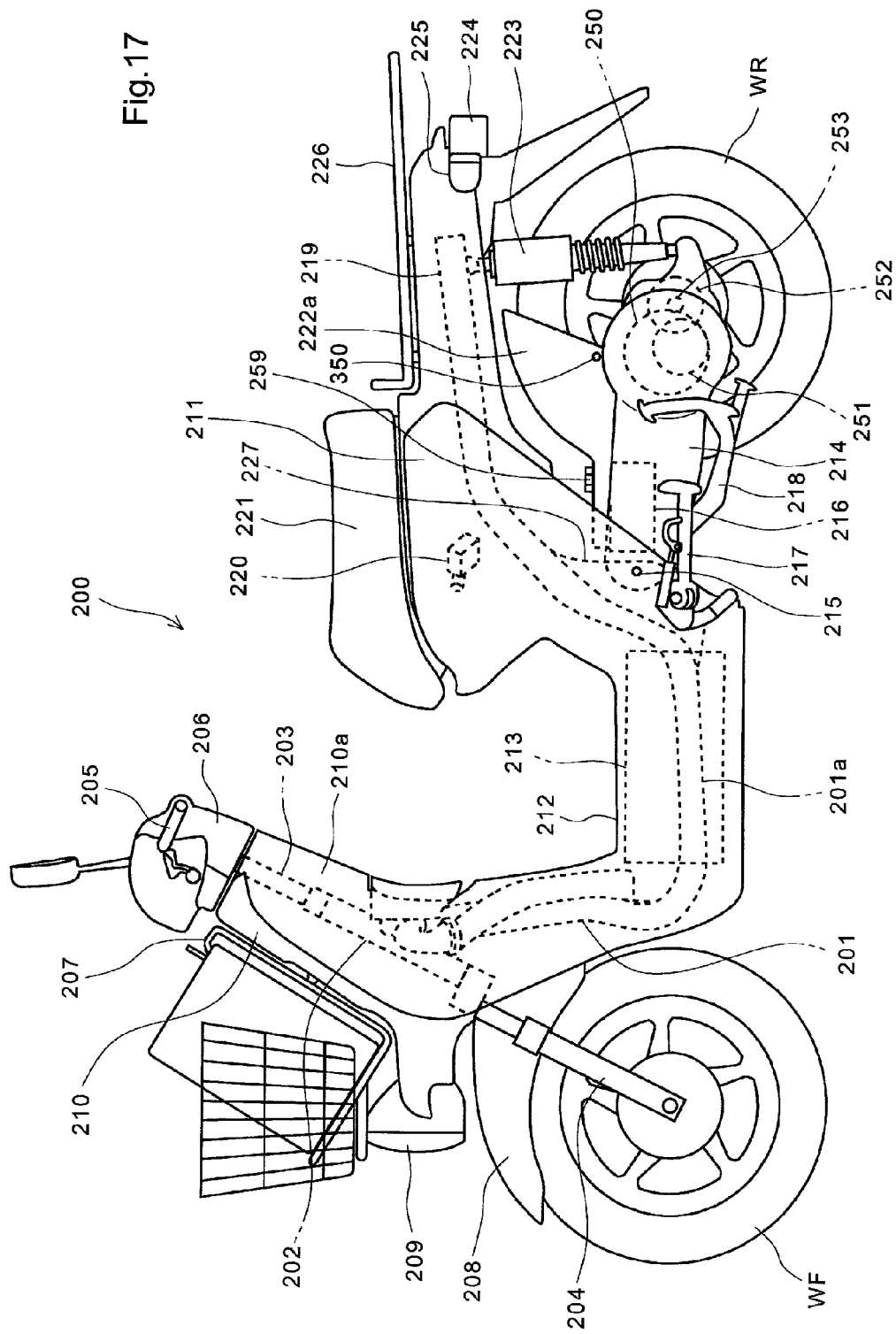
FIG. 17 is a side view illustrating an electric vehicle in which a rear fender is attached according to a modified example.
Figure 18:
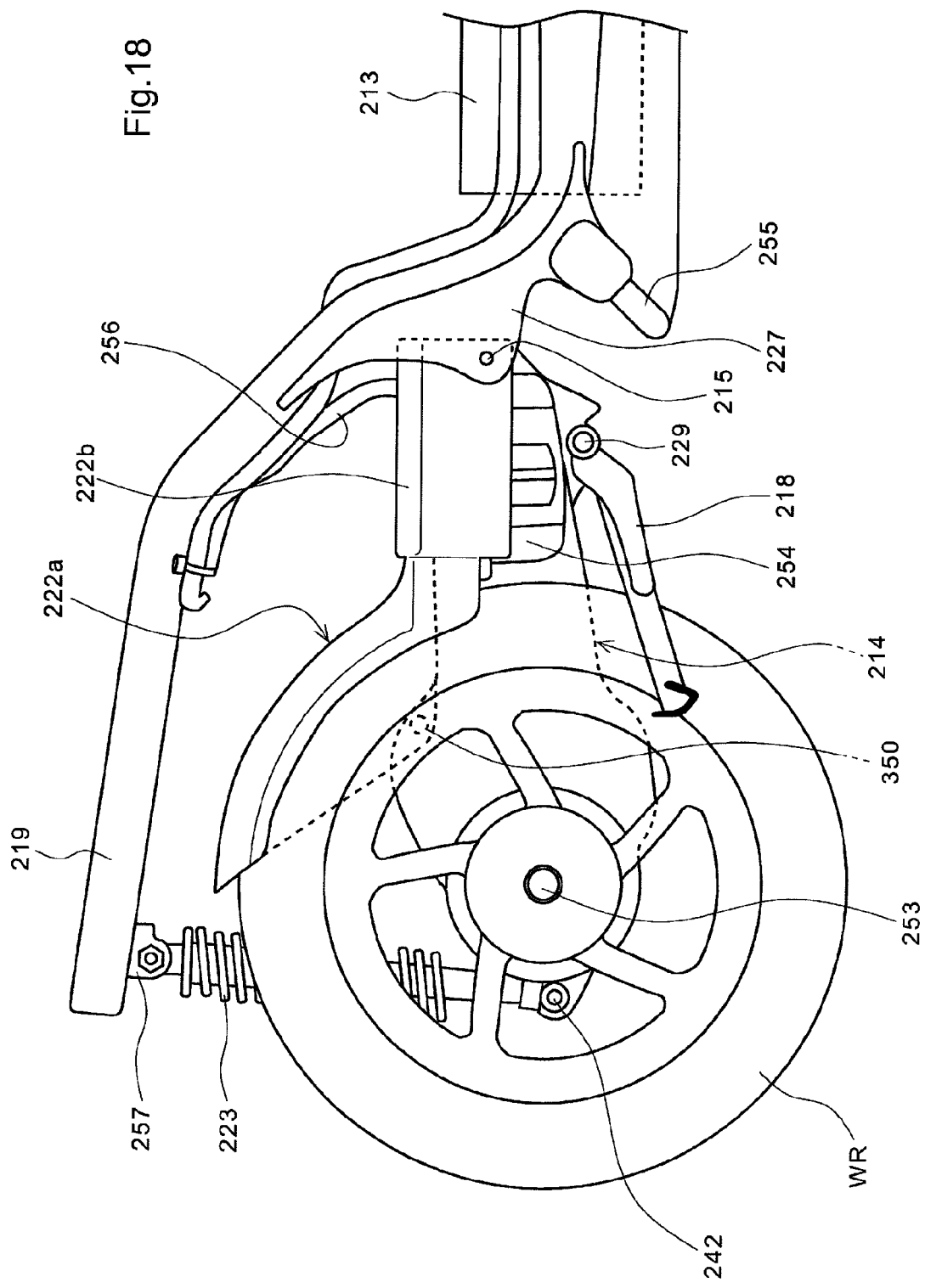
FIG. 18 is a partially enlarged view when the electric vehicle in which the rear fender is attached according to the modified example is seen from the right side of the vehicle body of the electric vehicle.
Figure 19:
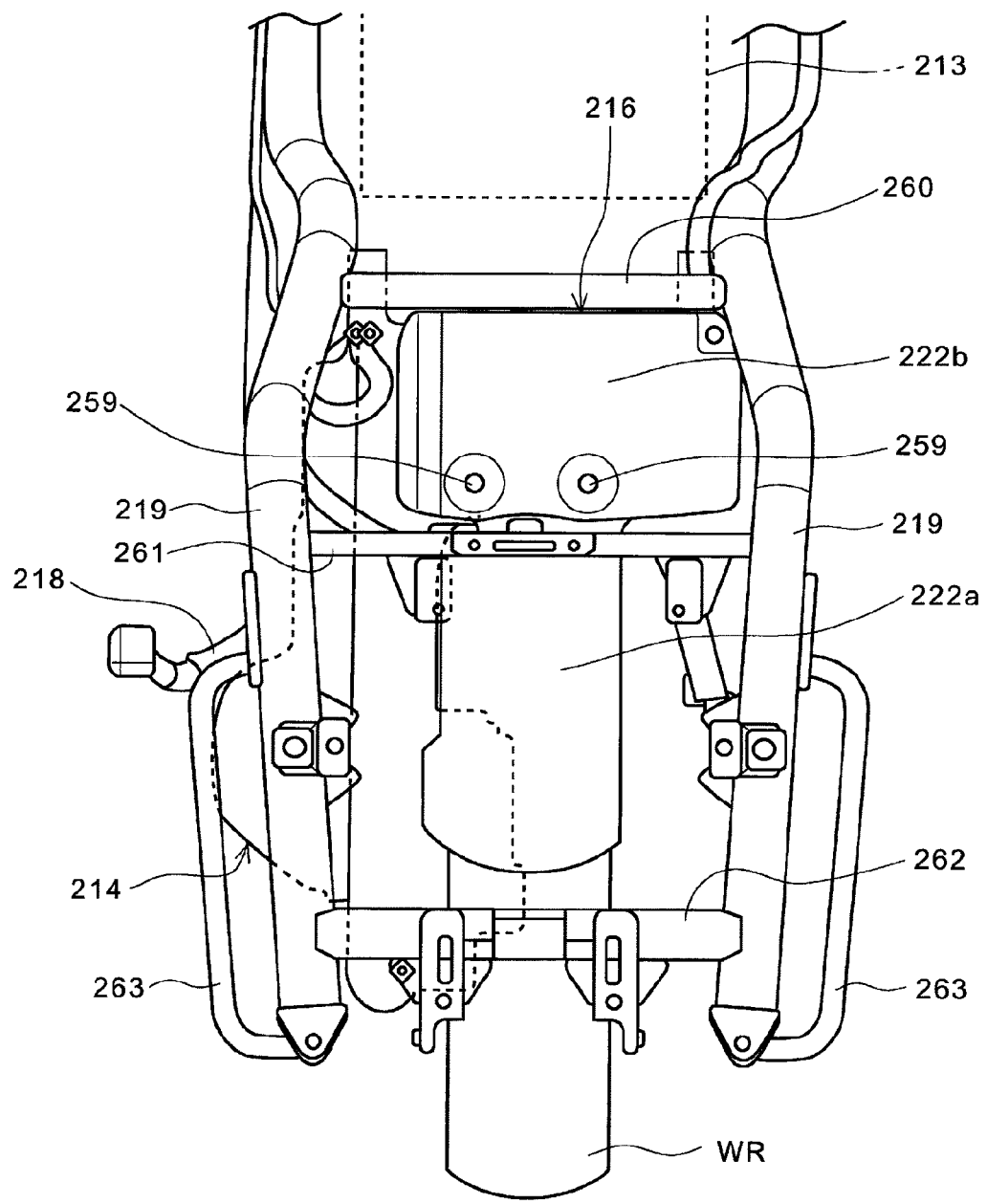
FIG. 19 is a partially enlarged view when the electric vehicle in which the rear fender is attached according to the modified example is seen from the right side of the vehicle body of the electric vehicle.

Furthermore, the rear fender of the electric vehicle 200 is not limited to have a shape shown in FIGS. 1, 15, and 16, and may have a shape, for example, shown in FIGS. 17, 18, and 19. In FIGS. 17, 18, and 19, the same reference numerals respectively indicate the same or equivalent components. In this modified example, since an end portion of a rear fender 222a at the front side of the vehicle body extends to the front side of the vehicle body and a square cover portion 222b is integrally formed therewith, it is possible to protect the upper surface portion of the motor driver 216 in addition to a dust guard function. Regarding the method of fastening the rear fender 222a with respect to the swing arm 214, even in this modified example, a three-point support is adopted by using one fastening member 350 directed in the width direction of the vehicle and fixed to the arm portion of the swing arm 214 and two fastening members 259 fixed to the upper surface of the motor driver 216.

Figure 20:
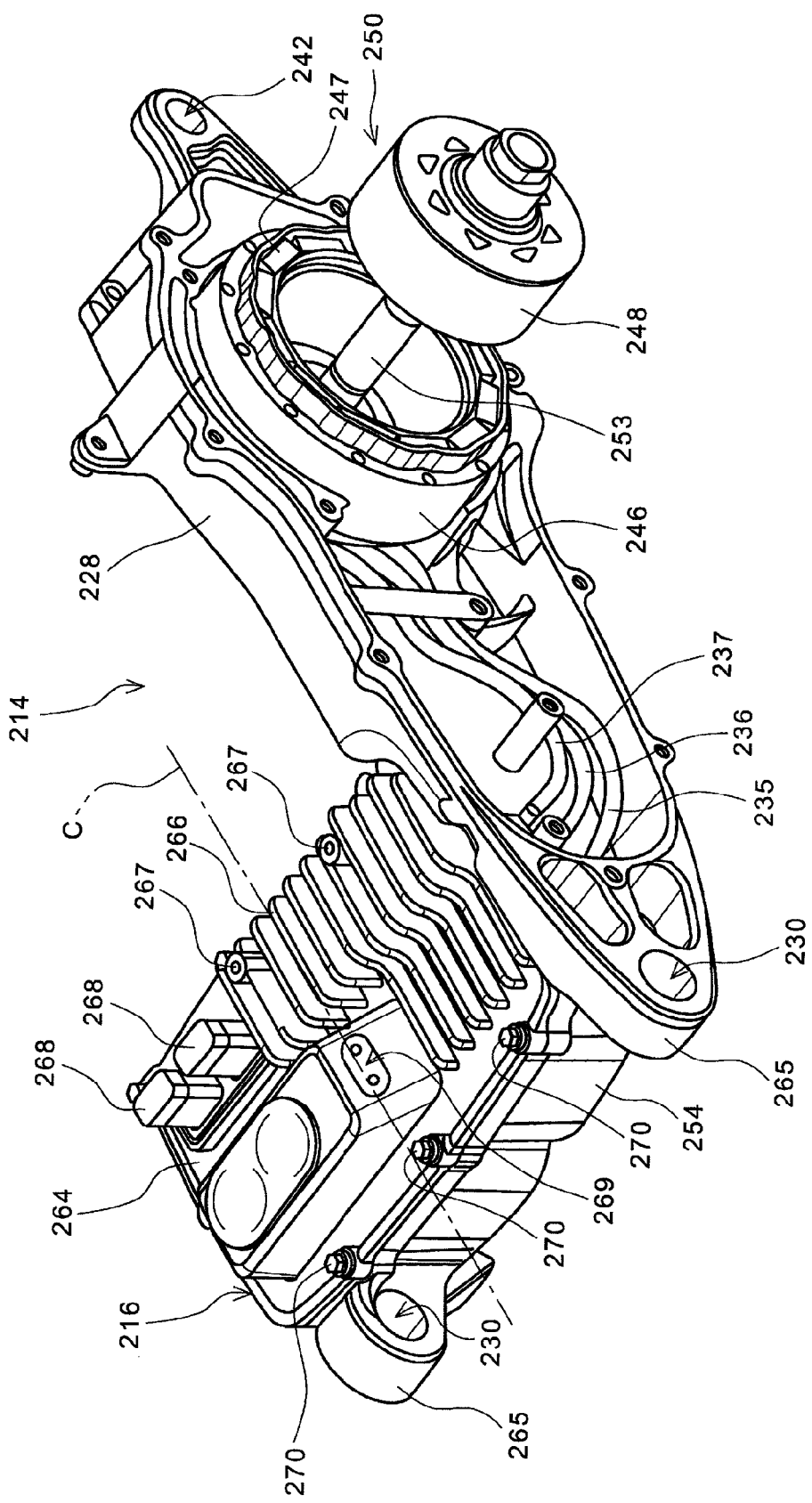
FIG. 20 is a perspective view illustrating a swing arm according to the second embodiment of the present invention.
Figure 21:
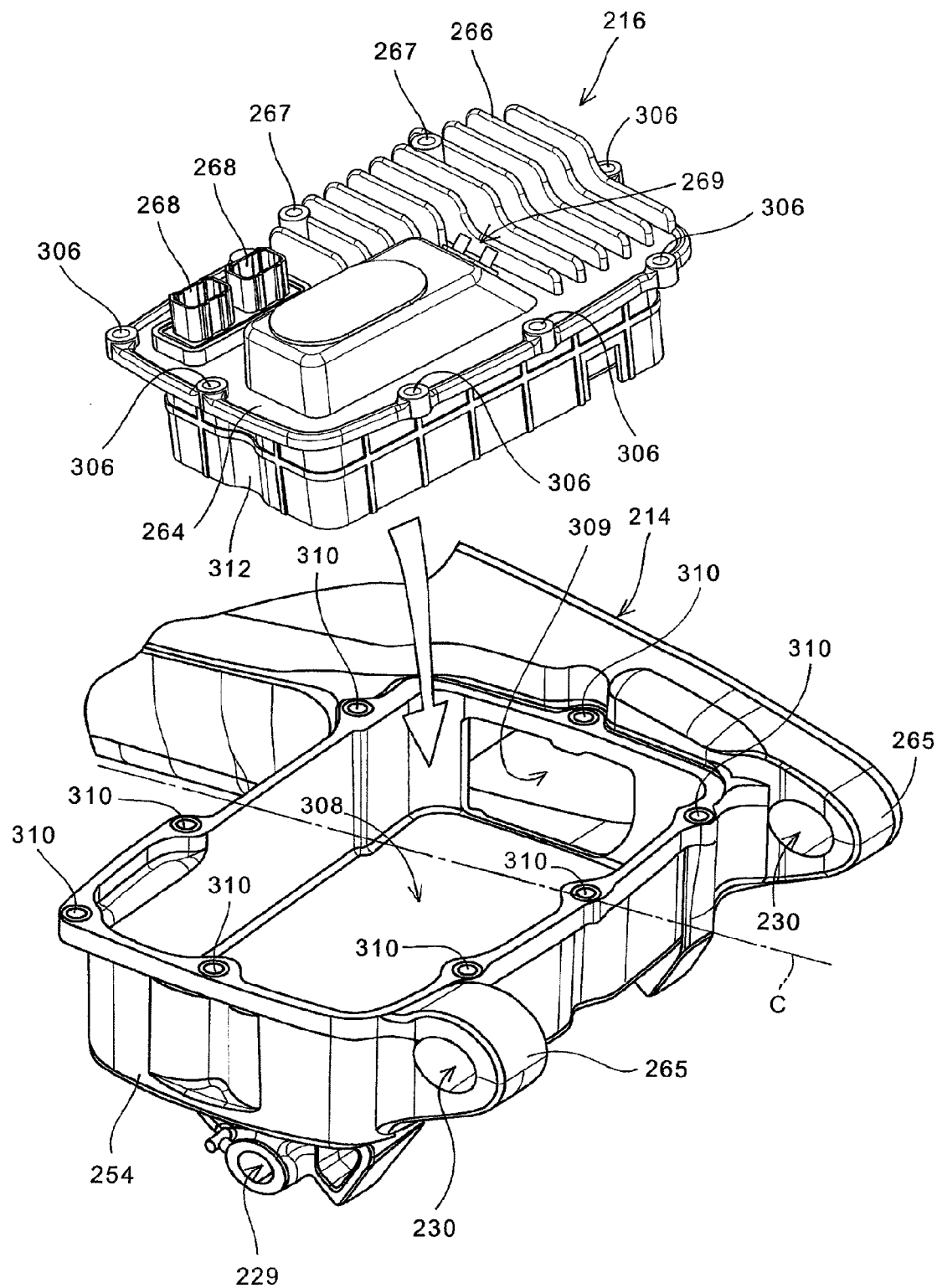
FIG. 21 is a perspective view illustrating a state where the swing arm and the motor driver are separated from each other.

FIG. 20 is a perspective view illustrating the swing arm 214. Further, FIG. 21 is a perspective view illustrating a state where the swing arm 214 and the motor driver 216 are separated from each other. The same reference numerals respectively indicate the same or equivalent components. FIGS. 20 and 21 illustrate a state where a swing arm cover 276 (refer to FIG. 22) attached to the left side of the power transmission casing 228 in the width direction of the vehicle is detached. A boss 265 with the penetration hole 230 of the pivot shaft is formed at the front end portion of the power transmission casing 228 and the right front end surface portion of the wide casing 254 in the width direction of the vehicle.

A recess 308 is formed at the wide casing 254 to be opened to the upside of the vehicle body, and the motor driver 216 is accommodated inside the swing arm 214 in a manner of being inserted from the upside of the recess 308. A penetration hole 309 is formed at the left side surface of the wide casing 254 in the width direction of the vehicle to connect the motor driver 216 and the power supply line to each other.

The motor driver 216 includes a body 312 and a cover member 264 fixed to the upper portion of the body 312. The edge portion of the cover member 264 is provided with a plurality of penetration holes 306 serving as an attachment portion fixing the motor driver 216 to the swing arm 214, and the motor driver 216 is fixed to the swing arm 214 in a manner such that the motor driver 216 is inserted into the recess 308, a bolt 270 serving as a fastening member passes through the penetration hole 306, and a bolt 270 is threaded into a female screw portion 310 provided at the edge portion of the wide casing 254. With this configuration, the opening of the recess 308 is covered with the cover member 264 when the motor driver 216 is attached to the swing arm 214, so that a closed space is formed, and the waterproof/vibration-proof function of the motor driver 216 is exhibited with the attachment operation.

The upper surface of the cover member 264 is provided with two couplers 268 to which the control system harness 256 is connected, a plurality of cooling fins 266 which is directed in the longitudinal direction of the vehicle body, a terminal 269 to which the power system harness 258 is connected, and two attachment holes 267 which are used to attach the rear fender 222 (222a).

Figure 22:
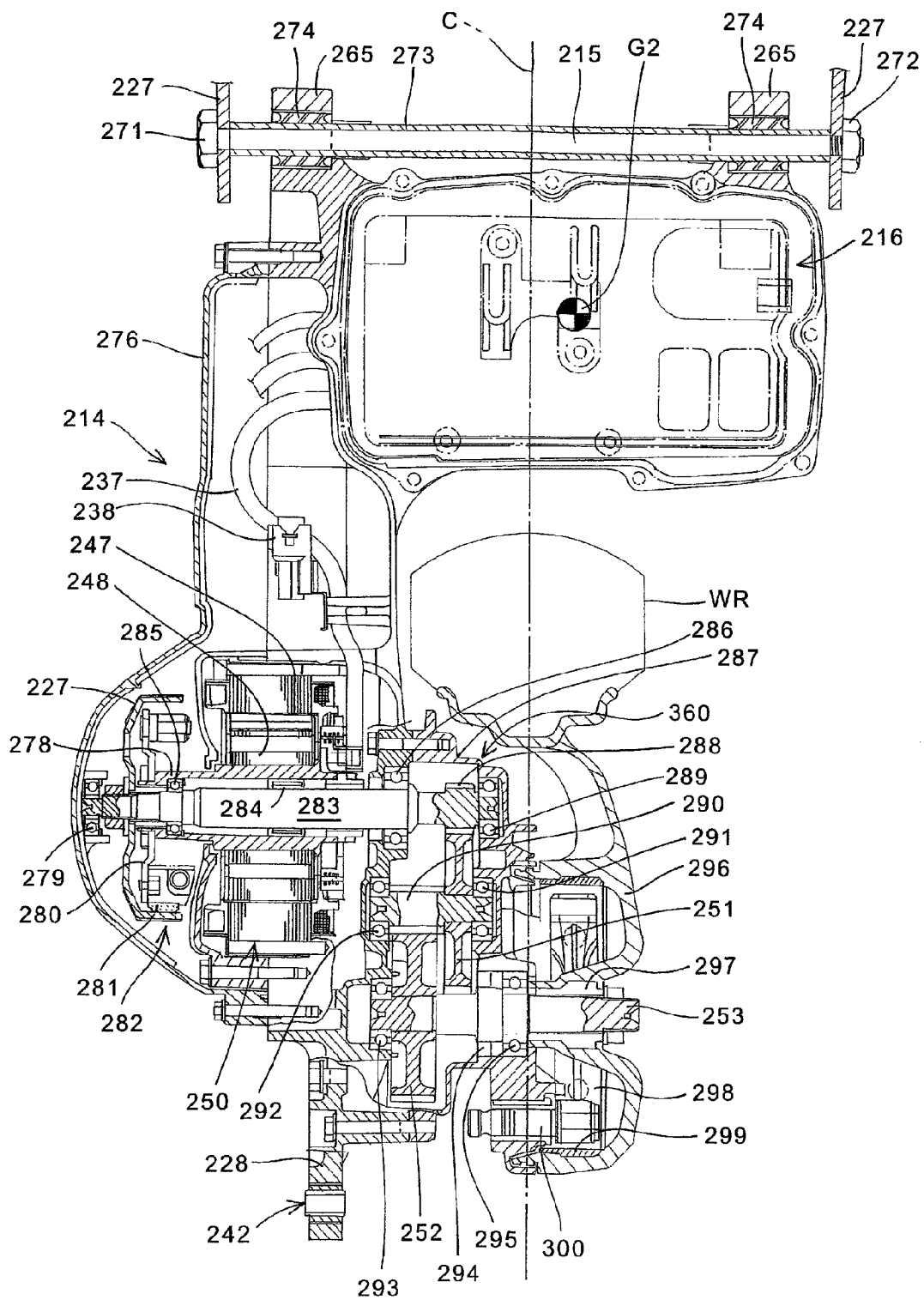
FIG. 22 is a cross-sectional view illustrating the swing arm when seen from the upside of the vehicle body.

FIG. 22 is a cross-sectional view illustrating the swing arm 214 when seen from the upside of the vehicle body. The same reference numerals respectively indicate the same or equivalent components. The swing arm 214 is swingably journaled to the pair of left and right pivot plates 227 through the swing arm pivot (the pivot shaft) 215. The pivot shaft 215 is an elongated bolt with a screw head 271, and is fixed by a right nut 272 in the width direction of the vehicle while being fitted into a cylindrical collar 273 supported by the boss 265 near the swing arm 214 through a bush 274. Furthermore, the bush 274 is welded to the cylindrical collar 273, and a collar member with a small thickness is welded to the outer periphery of the bush 274. Then, the collar member and the bush 274 are press-inserted into the penetration hole 230 of the boss 265, so that the position of the swing arm 214 in the width direction of the vehicle is defined.

As described above, the motor driver 216 is accommodated in the wide casing 254 at the front side of the rear wheel WR. Accordingly, the motor driver 216 is disposed near the front side of the swing arm 214 so that the vehicle body centerline C passing through the front and rear wheels of the electric vehicle 200 is disposed across the width direction of the vehicle. In the electric vehicle 200 according to the embodiment, the biasing of the weight balance in the width direction of the vehicle is settled by disposing the electric motor 250 to be offset leftward in the width direction of the vehicle on the basis of the examination of the arrangement of the motor driver 216 as in the electric vehicle 1.

The swing arm 214 according to the embodiment is a cantilever type that journals the rear wheel WR only using the left arm portion, and the electric motor 250, a centrifugal clutch 282 serving as a disconnection/connection mechanism of the rotational driving force, and a speed reducing mechanism 360 are intensively disposed at the rear side of the vehicle body in the arm portion.

The electric motor 250 is configured as an inner rotor type including the stator 247 which is fixed to the inner wall of the swing arm 214 and includes the stator coil and the rotor 248 which is fixed to the motor driving shaft 278. The centrifugal clutch 282 includes a drive plate 280 which is provided with a clutch shoe 281 and a clutch outer 277 which is rotated by a friction force of the clutch shoe 281. The drive plate 280 is fixed to the left end portion of the motor driving shaft 278 shown in the drawing, whereas the clutch outer 277 is fixed to an output shaft 283 rotatably inserted through the motor driving shaft 278. Furthermore, the motor driving shaft 278 and the output shaft 283 are configured to be rotatable relative to each other through a needle roller bearing 284 and a ball bearing 285.

Then, the centrifugal clutch 282 has a configuration in which the clutch shoe 281 moves outward in the radial direction to generate a friction force when the motor driving shaft 278 rotates at a predetermined rpm or more, that is, the drive plate 280 rotates at a predetermined rpm or more, so that the clutch outer 277 is rotated by the friction force. Accordingly, a rotational driving force of the electric motor 250 is transmitted to the output shaft 283. Furthermore, the left end portion of the output shaft 283 in the width direction of the vehicle is journaled by a bearing 279 fitted to the swing arm cover 276. Further, the right output shaft 283 in the width direction of the vehicle is journaled through a bearing 286 fitted to the power transmission casing 228 and a bearing 289 fitted to the speed reducing gear casing 287.

The rotational driving force transmitted to the output shaft 283 is transmitted to a final output shaft (an axle) 253 through the speed reducing mechanism 360. Specifically, the rotational driving force is transmitted to the final output shaft 253 which is fixed to the second speed reducing gear 252 and is rotatably journaled through a bearing 293 fitted to the power transmission casing 228 and a bearing 295 fitted to the speed reducing gear casing 287 after the rotational driving force is transmitted via the first speed reducing gear 251 which meshes with a speed reducing gear 288 provided at the right end portion of the output shaft 283 shown in the drawing, a first speed reducing shaft 290 which is fixed to the first speed reducing gear 251 and is rotatably journaled through a bearing 291 fitted to the speed reducing gear casing 287 and a bearing 292 fitted to the power transmission casing 228, and the second speed reducing gear 252 which meshes with the speed reducing gear provided in the first speed reducing shaft 290.

A wheel 296 of the rear wheel WR is fixed to the right end portion of the final output shaft 253 shown in the drawing through a collar 297. A brake drum with a liner 299 is formed at the inner diameter side of the wheel 296, and a pair of upper and lower brake shoes 298 is accommodated therein which is driven by a brake cam 300 about an anchor pin 301 (refer to FIG. 23). Furthermore, an oil seal 294 is disposed at the left side of the bearing 295 shown in the drawing.

Figure 23:
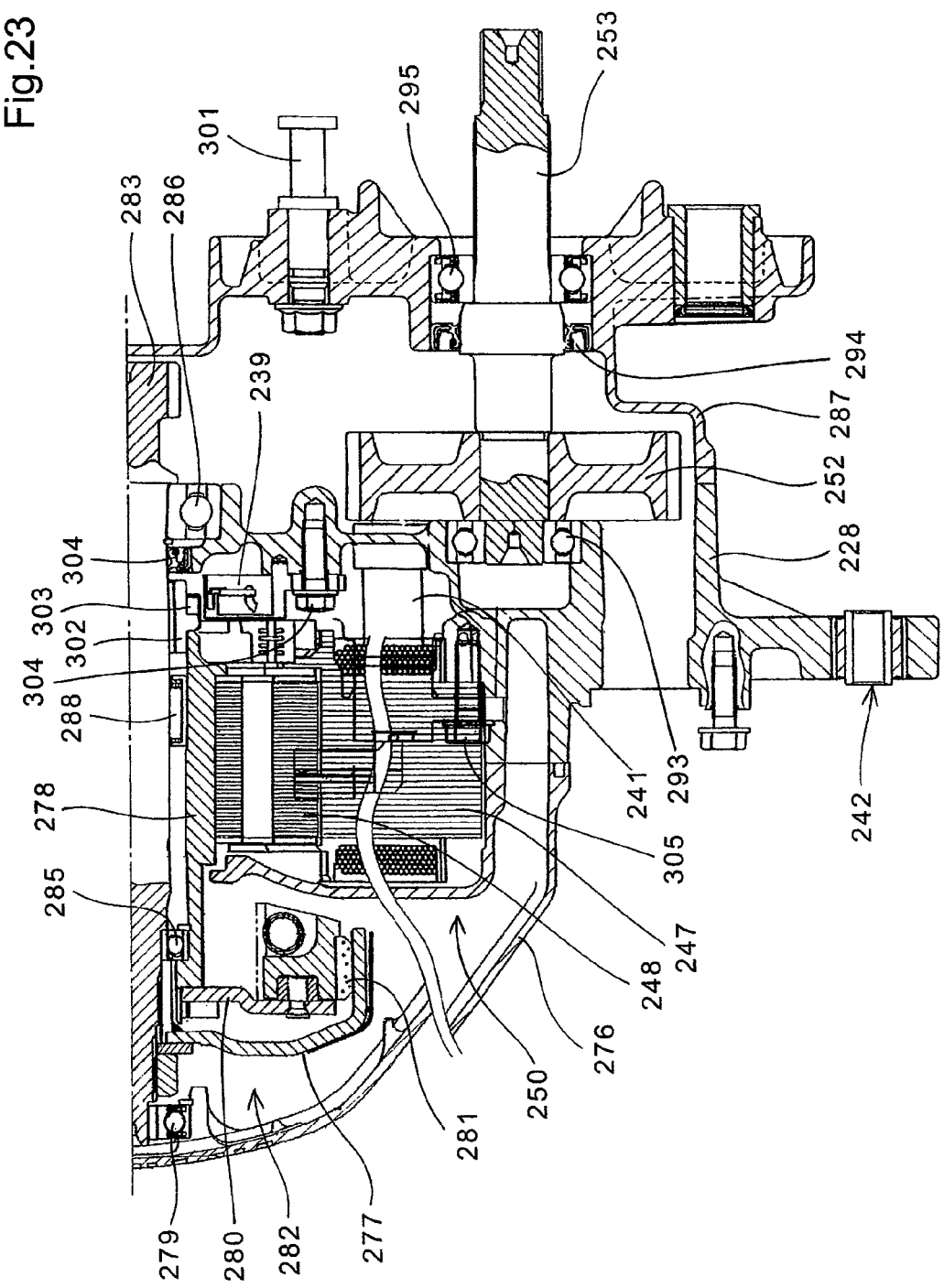
FIG. 23 is an enlarged cross-sectional view illustrating a peripheral mechanism of the electric motor.

FIG. 23 is an enlarged cross-sectional view illustrating a peripheral mechanism of the electric motor 250. The same reference numerals respectively indicate the same or equivalent components. A cylindrical collar 302 attached with a magnet 303 serving as a detected subject is fixed to the right end portion of the motor driving shaft 278 in the width direction of the vehicle shown in the drawing. The motor rotation speed sensor 239 fixed to the power transmission casing 228 through a bolt 304 detects the rotation speed of the electric motor 250 by detecting a passage state of the magnet 303 with the rotation of the motor driving shaft 278. Furthermore, an oil seal 304 is disposed at the left side of the bearing 286 shown in the drawing.

Further, a non-contact type vehicle speed sensor 241 is closely disposed at the left side of the second speed reducing gear 252 shown in the drawing to detect the vehicle speed on the basis of the rotation speed of the second speed reducing gear 252. The vehicle speed sensor 241 is fixed to the power transmission casing 228 through a bolt 305.

Figure 24:
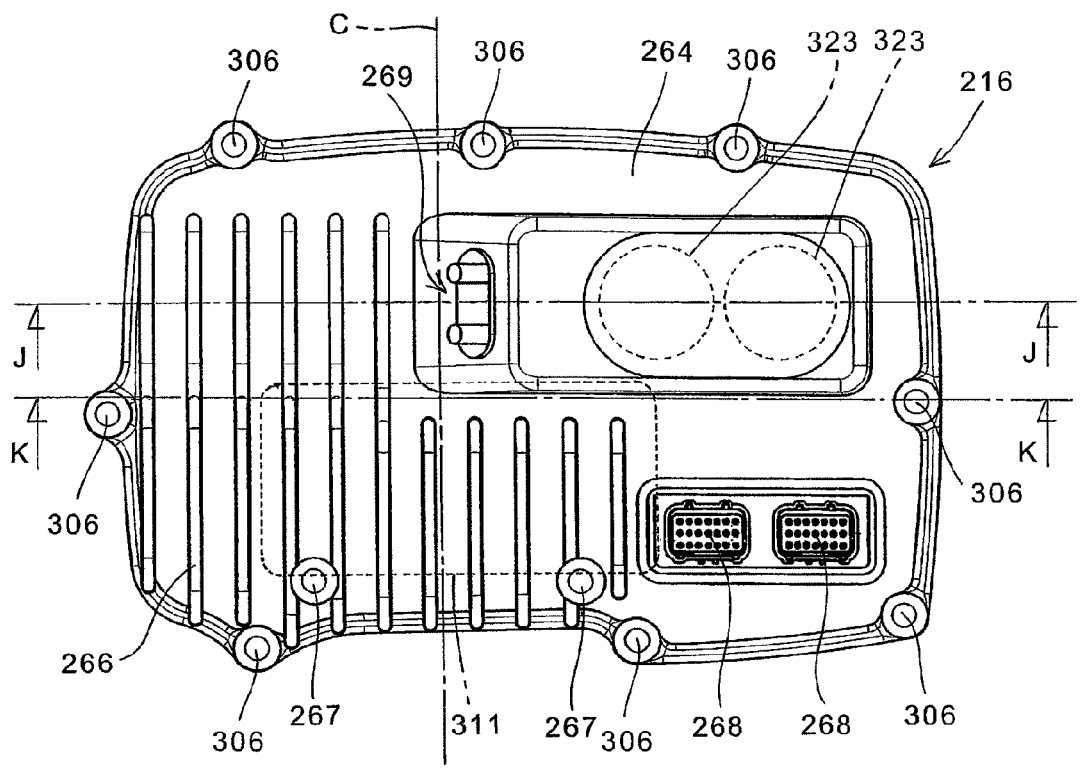
FIG. 24 is a plan view illustrating a motor driver according to the second embodiment of the present invention.
Figure 25:
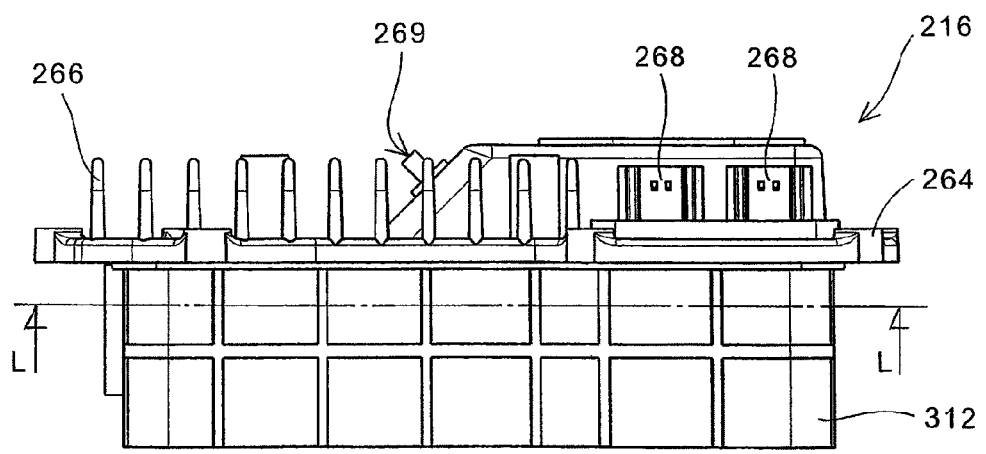
FIG. 25 is a front view illustrating the motor driver according to the second embodiment of the present invention.
Figure 26:
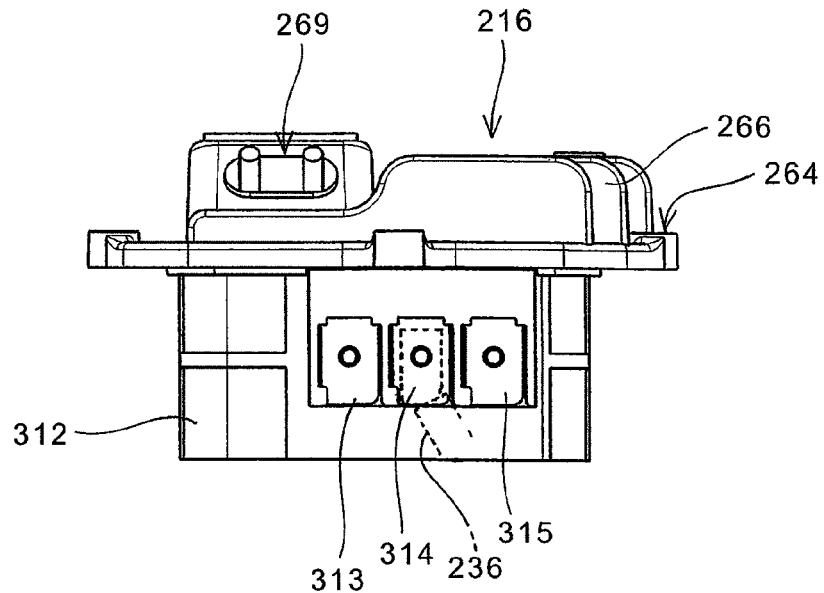
FIG. 26 is a side view illustrating the motor driver according to the second embodiment of the present invention.

FIG. 24 is a plan view illustrating the motor driver 216. Further, FIG. 25 is a front view illustrating the same, and FIG. 26 is a side view illustrating the same. The same reference numerals respectively indicate the same or equivalent components. In the plan view of FIG. 24, the motor driver at the front side of the vehicle body is seen from the upside thereof. The peripheral edge portion of the cover member 264 of the motor driver 216 is provided with eight penetration holes 306 in total. The peripheral edge portion of the cover member 264 is formed to be located at the outside more than the body 312, so that the peripheral edge portion serves as an attachment flange contacting the upper end surface of the wide casing 254.

The uplift portion provided with the terminal 269 connected with the power system harness 258 is disposed at the right side of the cover member 264 in the width direction of the vehicle and is disposed at the front side of the vehicle body. The eleven cooling fins 266 directed in the longitudinal direction of the vehicle body are formed from the left end portion in the width direction of the vehicle to the rear side of the uplift portion. The cooling fins 266 extend to the upside of the vehicle body up to the approximately same height as that of the upper surface of the uplift portion. The two couplers 268 to which the control system harness 256 is connected are disposed at the right side in the width direction of the vehicle. An insulation sheet 311 to be described later is disposed at a position adjacent to the control system harness 256 and located below the cooling fin 266. The left side surface of the body 312 in the width direction of the vehicle is provided with terminals 313, 314, and 315 which are used for the connection of three power supply lines. The insulation sheet 311 and the terminal 269 are disposed at the vicinity of the vehicle body centerline C, that is, the approximate center of the vehicle body. Further, a capacitor 323 to be described later and the couplers 268 are disposed at the outside in the width direction of the vehicle more than the terminal 269 and the insulation sheet.

Figure 27:
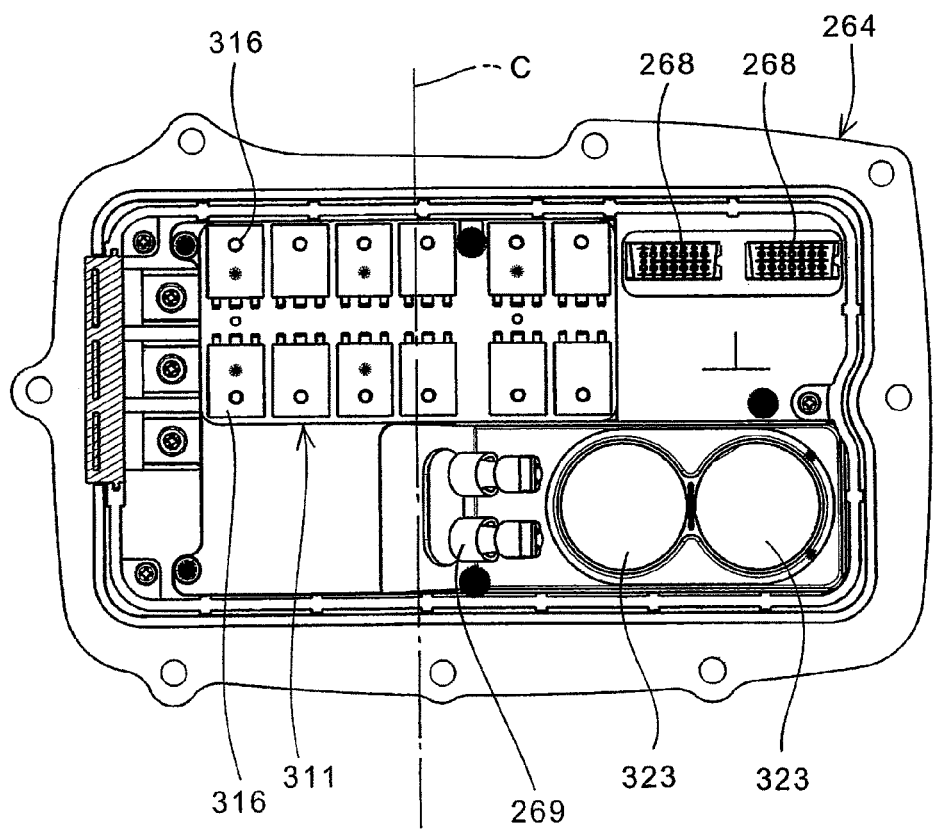
FIG. 27 is a cross-sectional view taken along the line L-L of FIG. 25.

FIG. 27 is a cross-sectional view taken along the line L-L of FIG. 25. The rear surface of the cover member 264 is provided with an FET 316 serving as a switching element connecting and disconnecting the supply of a current to the motor. Twelve FETs 316 in total are fixed to the cover member 264 through the insulation sheet 311 by a fastening member. In the motor driver 216 according to the embodiment, since the FETs 316 are supported to the rear surface of the portion serving as a heat sink provided with the cooling fins 266, it is possible to efficiently cool the FETs 316 radiating heat when the motor is driven.

Figure 28:
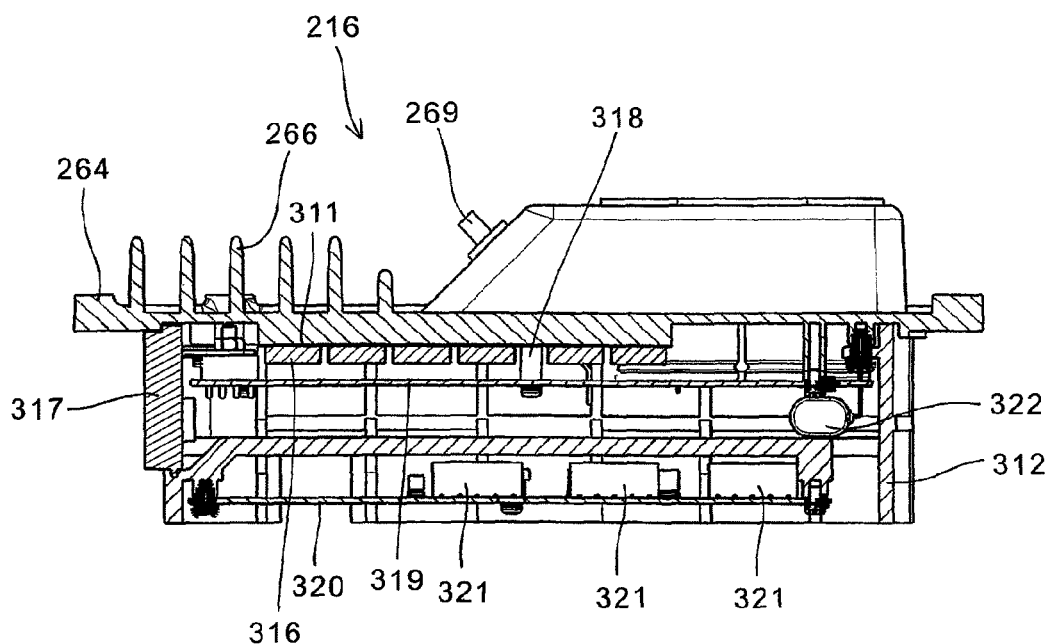
FIG. 28 is a cross-sectional view taken along the line K-K of FIG. 24.
Figure 29:
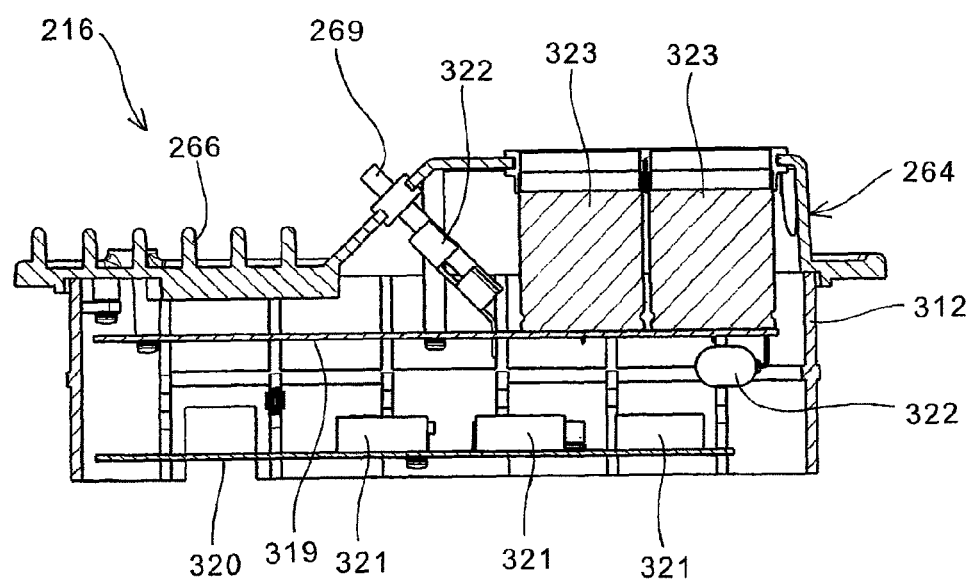
FIG. 29 is a cross-sectional view taken along the line J-J of FIG. 24.

FIG. 28 is a cross-sectional view taken along the line K-K of FIG. 24. Further, FIG. 29 is a cross-sectional view taken along the line J-J. As described above, the FETs 316 are directly attached to the rear surface of the cover member 264 through the insulation sheet 311. A power substrate 319 transmitting a current of a high-voltage system is fixed to a position located below the FETs 316 and being close thereto through three bosses 318 in total extending from the rear surface of the cover member 264. Accordingly, the power substrate 319 is also disposed to be close to the cover member 264, and heat radiated from the motor-driving-type power substrate 319 is efficiently cooled.

Furthermore, when the FETs and the power substrate 319 are attached to the cover member 264, the FETs 316 are first fixed to the rear surface of the cover member 264, and the power substrate 319 is disposed at a predetermined position, so that the terminal provided at each of the FETs 316 penetrates the power substrate 319. Next, the FETs 316 and the power substrate 319 are connected to each other by flow soldering, and the power substrate 319 is fixed to the boss 318.

Further, the upper surface of the power substrate 319 is attached with two capacitors 323 smoothing the power of the inverter and a connection member 322 connected to the terminal 269. Furthermore, a film capacitor 317 is provided between the cover member 264 and the body 312 to absorb inverter surge, and a film capacitor 322 is also disposed at the lower portion of the power substrate 319. A power transformer 321 used for power conversion is attached to a control substrate 320 having a control system element mounted thereon, and the control substrate 320 which does not need a countermeasure for heat radiated therefrom is fixed to the vicinity of the lower end portion of the body 312. The interior of the body 312 is electrically insulated by resin molding or the like after the cover member and the body 312 are fastened to each other through a fastening member such as a bolt and each substrate or the like is attached to the body 312. Furthermore, an example of the element directly supported by the cover member 264 is not limited to the FET 316 or the power substrate 319, but may include another element which greatly needs a countermeasure for heat radiated therefrom.

The swing arm, the shapes or the structures of the electric motor, the motor driver, the low-voltage battery, the high-voltage battery, and the like, the arrangement relationship between the motor driver and the electric motor, and the like are not limited to the above-described embodiment, and may be modified into various forms. For example, the motor driver may be disposed at the upper surface side of the swing arm, and be disposed to be offset rightward at that position more than the vehicle body centerline. Furthermore, the swing arm may be configured as a cantilever type having an arm portion only at the right side of the vehicle body, the electric motor may be accommodated at the rear portion of the arm portion, and the position of the center of gravity of the motor driver may be offset leftward of the vehicle body centerline. The electric vehicle according to the present invention is not limited to the electric bicycle, and may be applied to a tricycle or a quadricycle.

REFERENCE SIGNS LIST 1, 200: ELECTRIC VEHICLE,
2: MAIN FRAME,
3: HEAD PIPE,
5: SIDE FRAME,
11, 215: SWING ARM PIVOT,
12, 214: SWING ARM,
17: LOADING ROOM,
18: CENTER STAND,
20, 227: PIVOT PLATE,
30: LOW-VOLTAGE BATTERY,
31, 213: HIGH-VOLTAGE BATTERY,
32: DC-DC CONVERTER,
33: CONTACTOR BOX,
34: CONTROL DEVICE (MGU),
35, 216: MOTOR DRIVER,
40: CENTRIFUGAL CLUTCH (DISCONNECTION/CONNECTION MECHANISM),
41: CLUTCH OUTER,
42: DRIVE PLATE,
43: OUTPUT SHAFT,
44: CLUTCH SHOE,
50, 250: ELECTRIC MOTOR,
51: STATOR,
52: ROTOR,
53, 278: MOTOR DRIVING SHAFT,
70: SPEED REDUCING MECHANISM,
264: COVER MEMBER,
308: RECESS,
C: VEHICLE BODY CENTERLINE,
G1: POSITION OF CENTER OF GRAVITY OF HIGH-VOLTAGE BATTERY,
G2: POSITION OF CENTER OF GRAVITY OF MOTOR DRIVER

The invention claimed is:

1. An electric straddled vehicle comprising:
a swing arm which is swingably journaled to a vehicle body frame and rotatably journals a rear wheel;
an electric motor which supplies a rotational driving force to said rear wheel; and
a motor driver which has a driving circuit of the electric motor in said swing arm,
wherein said electric motor is disposed at a position where a rotary shaft of said electric motor is parallel to an axle of said rear wheel and is offset therefrom in the width direction of the vehicle and at least one portion of said electric motor at one side position of said rear wheel in the width direction of the vehicle overlaps said rear wheel when seen from a side portion of the vehicle body, and
said motor driver is disposed at a front side of the rear wheel of the vehicle body and across the width direction of the vehicle body centerline.

2. The electric straddled vehicle according to claim 1, wherein said motor driver is disposed such that a position of the center of gravity thereof is offset in a direction opposite to an offset direction of said electric motor with respect to the vehicle body centerline.

3. The electric straddled vehicle according to claim 1, wherein said motor driver is disposed at a rear side of the vehicle body in a swing shaft to be close to the swing shaft of said swing arm, and is inserted into a recess being open at an upper surface of said swing arm to be attached into said swing arm.

4. The electric straddled vehicle according to claim 3, wherein said motor driver includes a body and a cover member fixed to an upper portion of the body,
wherein at least a switching element disconnecting or connecting a supply of a current to the motor is supported to a lower surface of said cover member, and
when said motor driver is attached to said swing arm, said cover member is exposed to the outside.

5. The electric straddled vehicle according to claim 4, wherein said cover member is provided with an attachment portion which is used to fix said motor driver to said swing arm.

6. The electric straddled vehicle according to claim 4, wherein in said motor driver, a terminal is disposed at an approximate center of the vehicle body to be connected with a power system harness supplying power to a group of said switching element and a battery, and a coupler portion connected with a control system harness and a capacitor smoothing power of an inverter are provided at a position where said electric motor is offset from the vehicle body centerline and is located at the outside in the width direction of the vehicle.

7. The electric straddled vehicle according to claim 1, wherein said motor driver is disposed at the lower side of the vehicle body more than the swing shaft to be close to a swing shaft of said swing arm, and is inserted into an opening provided at the lower surface of said swing arm to be attached into said swing arm.

8. The electric straddled vehicle according to claim 1, wherein the upper surface of said swing arm is provided with an electric fan which is located above said motor driver.

9. The electric straddled vehicle according to claim 8, further comprising:
a plurality of heat radiation fins which is integrally formed on the upper surface of said swing arm above said motor driver to extend to an upper side of the vehicle body,
wherein said electric fan is disposed at upper portions of said heat radiation fins so that a rotary shaft is directed in a vertical direction of the vehicle body.

10. The electric straddled vehicle according to claim 1, further comprising:
a center stand which is rotatably journaled to said vehicle body frame,
wherein said center stand is configured to contact the lower surface of said swing arm at the lower side of the vehicle body in said motor driver when the center stand is retracted.

11. The electric straddled vehicle according to claim 1, further comprising:
a high-voltage battery which supplies power to said electric motor; and
a low-voltage battery which supplies power to electric auxiliary machinery and is smaller than said high-voltage battery,
wherein said electric motor is disposed inside said swing arm at a position overlapping a projection area of said rear wheel when seen from the side portion of the vehicle body, so that it is disposed to be offset in the width direction of the vehicle with respect to the vehicle body centerline passing through a front wheel and the rear wheel of said electric straddled vehicle, and
said high-voltage battery is disposed along a lower frame which extends backward and downward from a head pipe of said vehicle body frame and has the swing shaft of said swing arm provided at the rear side thereof, and said low-voltage battery is disposed to be offset in a direction opposite to the offset direction of said electric motor with respect to said vehicle body centerline.

12. The electric straddled vehicle according to claim 11, wherein said low-voltage battery is disposed at the side portion of said head pipe.

13. The electric straddled vehicle according to claim 11, wherein the position of the center of gravity of said high-voltage battery is set to be offset in the width direction of the vehicle with respect to said vehicle body centerline, and the offset direction is opposite to the offset direction of said electric motor with respect to the vehicle body centerline.

14. The electric straddled vehicle according claim 11, wherein said swing arm is of a cantilever type having only one arm portion rotatably journaling the rear wheel, and the rotary shaft of said electric motor is disposed to be parallel to the axle of said rear wheel.

15. The electric straddled vehicle according to claim 2, wherein said motor driver is disposed at a rear side of the vehicle body in a swing shaft to be close to the swing shaft of said swing arm, and is inserted into a recess being open at an upper surface of said swing arm to be attached into said swing arm.

16. The electric straddled vehicle according to claim 2, wherein said motor driver is disposed at the lower side of the vehicle body more than the swing shaft to be close to a swing shaft of said swing arm, and is inserted into an opening provided at the lower surface of said swing arm to be attached into said swing arm.

17. The electric straddled vehicle according to claim 2, wherein the upper surface of said swing arm is provided with an electric fan which is located above said motor driver.

18. The electric straddled vehicle according to claim 2, further comprising:
a center stand which is rotatably journaled to said vehicle body frame,
wherein said center stand is configured to contact the lower surface of said swing arm at the lower side of the vehicle body in said motor driver when the center stand is retracted.

\* \* \* \* \*